(12) United States Patent
McCafferty

(10) Patent No.: US 7,537,389 B1
(45) Date of Patent: May 26, 2009

(54) BEARING ASSEMBLY FOR SECURITY AND STORM SHUTTER

(75) Inventor: Keith McCafferty, Palm Bay, FL (US)

(73) Assignee: Precision Industries of Brevard, Inc., Palm Bay, FL (US)

( * ) Notice: Subject to any disclaimer, the term of this patent is extended or adjusted under 35 U.S.C. 154(b) by 568 days.

(21) Appl. No.: 11/223,662

(22) Filed: Sep. 9, 2005

(51) Int. Cl.
*F16C 19/06* (2006.01)
*F16C 33/58* (2006.01)

(52) U.S. Cl. ............... 384/499; 384/495; 384/489; 384/477

(58) Field of Classification Search ............ 384/18–19, 384/312, 437, 477–475, 492, 505, 537, 547, 384/590, 609–610, 615–618, 903, 912; 29/898.03, 29/898.07; 16/107; 104/94, 172.4; 105/154–155
See application file for complete search history.

(56) References Cited

U.S. PATENT DOCUMENTS

| | | | | |
|---|---|---|---|---|
| 2,794,691 | A | * | 6/1957 | Noe ............................ 384/495 |
| 3,469,892 | A | * | 9/1969 | Langstroth ................... 384/18 |
| 3,553,765 | A | * | 1/1971 | Frost ............................ 16/107 |
| 3,602,150 | A | * | 8/1971 | Frost et al. ................ 104/172.4 |
| 3,625,575 | A | * | 12/1971 | Darnell ........................ 384/18 |
| 3,722,968 | A | * | 3/1973 | Bomberger ................. 384/492 |
| 4,268,096 | A | * | 5/1981 | Cain et al. .................. 384/428 |
| 4,581,799 | A | * | 4/1986 | Bessinger ................. 29/898.03 |
| 4,606,656 | A | * | 8/1986 | LaRou ........................ 384/475 |
| 4,723,588 | A | | 2/1988 | Rüppel ........................ 160/236 |
| 4,909,640 | A | * | 3/1990 | Nakanishi ................... 384/615 |
| 5,028,151 | A | * | 7/1991 | Nisley ......................... 384/477 |
| 5,039,230 | A | * | 8/1991 | Phillips et al. .............. 384/560 |
| 5,447,377 | A | * | 9/1995 | Baumgartner et al. ....... 384/477 |
| 5,791,787 | A | * | 8/1998 | Nisley ......................... 384/498 |
| 5,957,185 | A | | 9/1999 | Robinson et al. ............ 160/183 |
| 6,189,264 | B1 | | 2/2001 | DiVeroli ........................ 49/57 |
| 6,886,294 | B1 | | 5/2005 | Carey ......................... 49/73.1 |

FOREIGN PATENT DOCUMENTS

| | | | |
|---|---|---|---|
| JP | 2003-342710 A | * | 12/2003 |
| JP | 2004-092888 A | * | 3/2008 |
| WO | WO 9800268 A1 | * | 1/1998 |

OTHER PUBLICATIONS

Roller Star Shutters and Components Catalog, (2001/2002), pp. 5-6, 51-54.

* cited by examiner

*Primary Examiner*—Marcus Charles
(74) *Attorney, Agent, or Firm*—Brian S. Steinberger; Joyce Morlin; Law Offices of Brian S. Steinberger, P.A.

(57) ABSTRACT

A roll-up shutter ball bearing assembly that does not rust, corrode, jam or stick is provided. The bearing assembly and method for assembly include the machining of a cylindrical metal insert with a peripherally grooved side wall for holding ball bearings that fit into a grooved outer bearing ring and are closed with a retaining washer or cap ring. The cylindrical metal insert, outer ring housing, retaining washer and ball bearings are made of rust resistant metal, such as stainless steel. The very high quality bearing assembly will not need to be replaced or serviced on a frequent basis and is an intended for use in roll-up storm and hurricane shutters currently on the market.

10 Claims, 18 Drawing Sheets

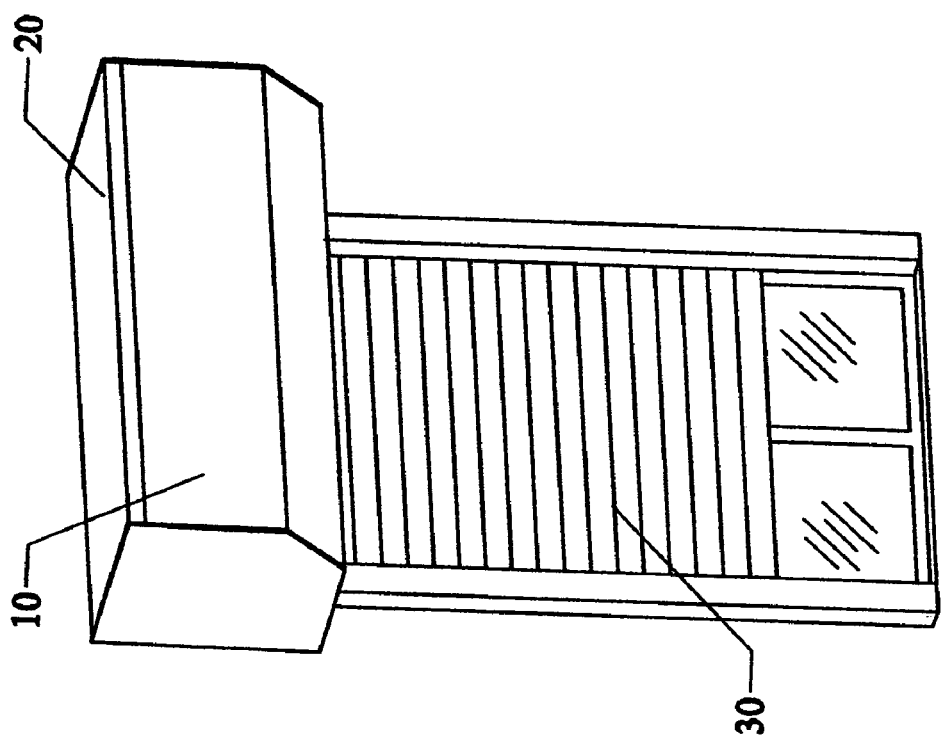

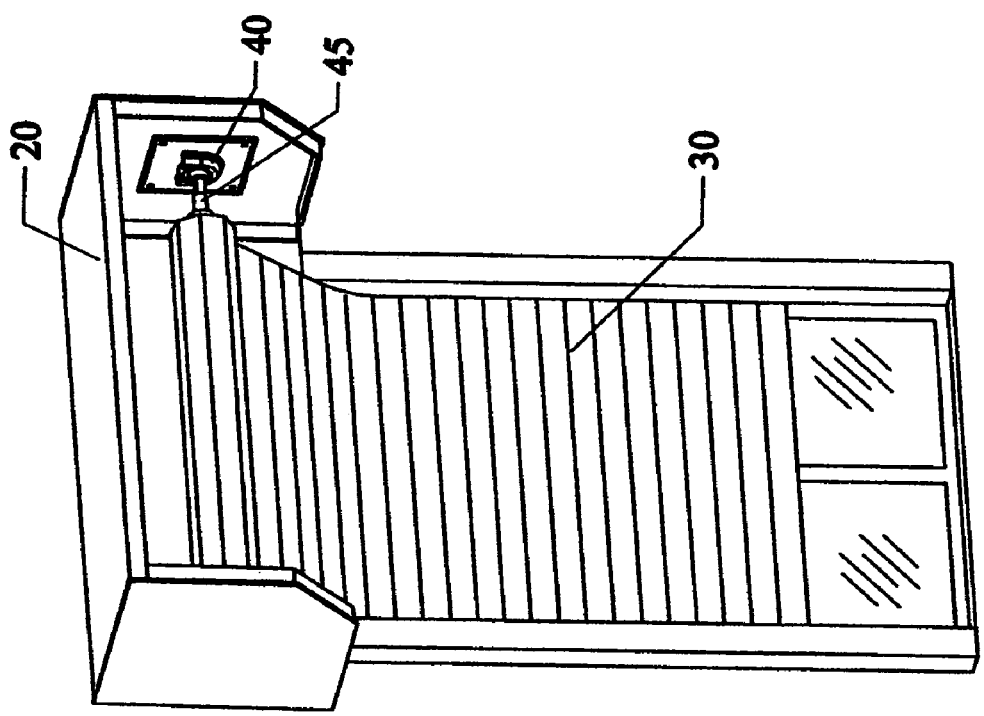

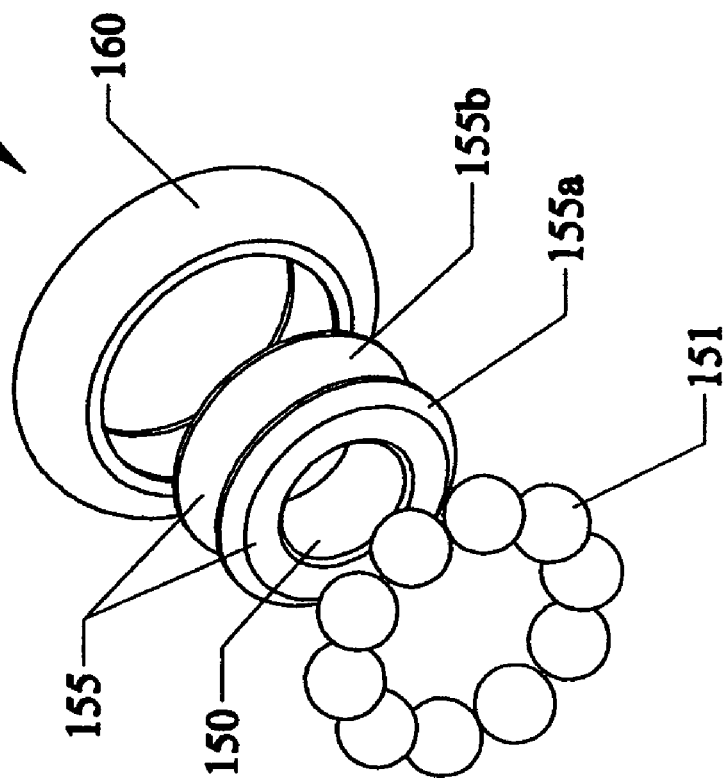
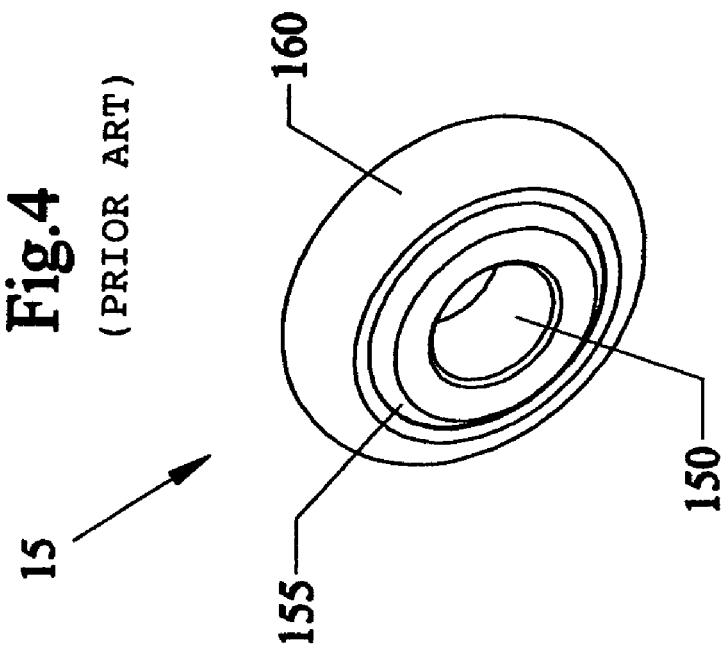

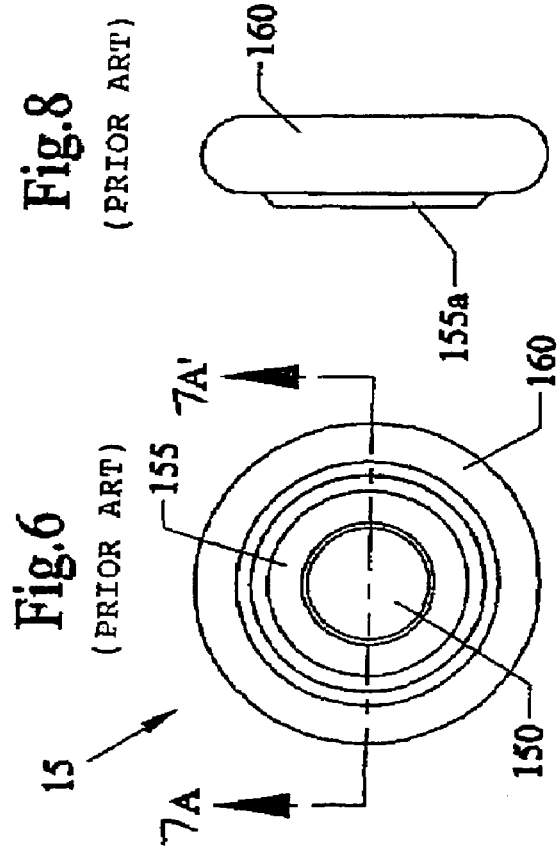
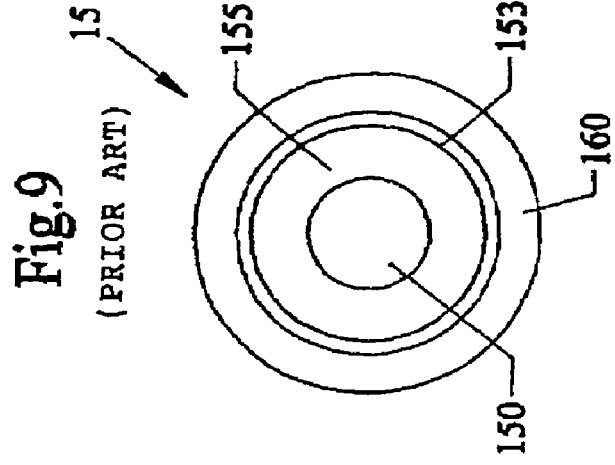
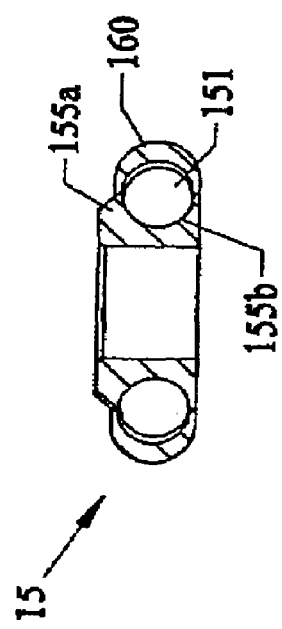

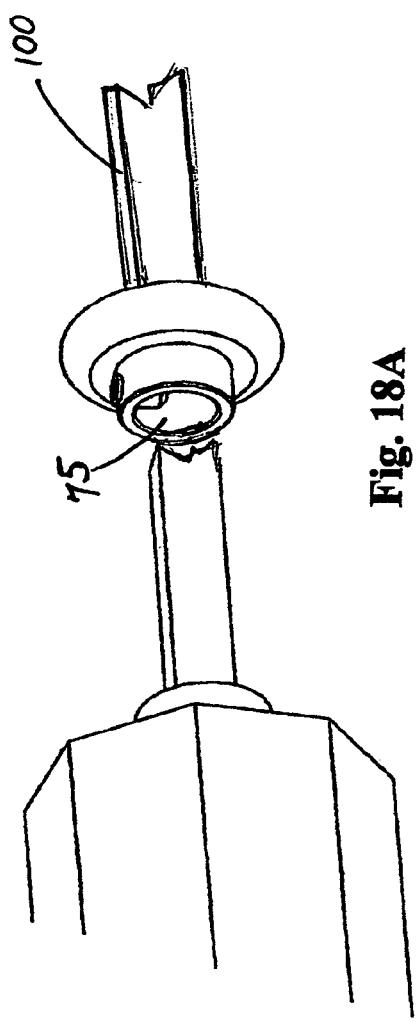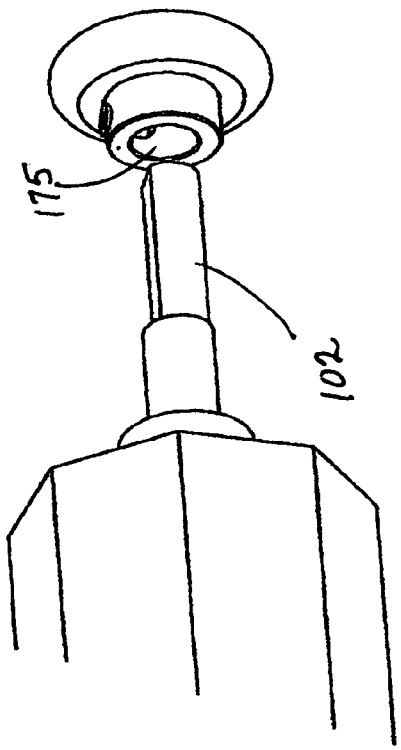
Fig. 18A
Fig. 18B

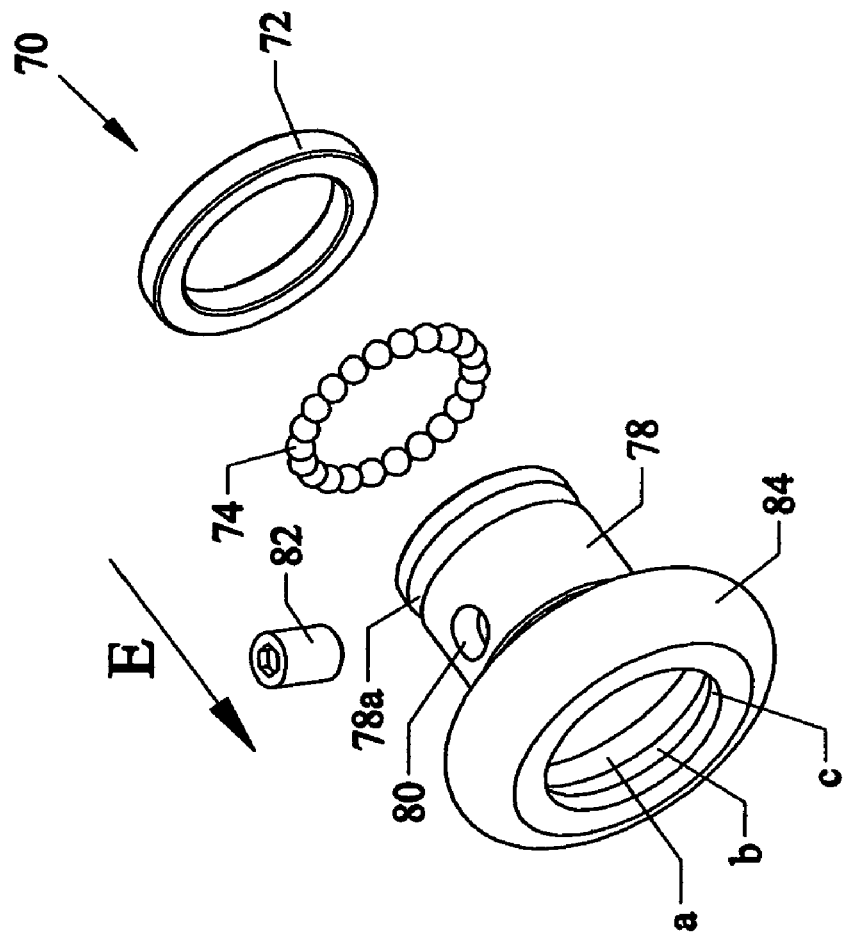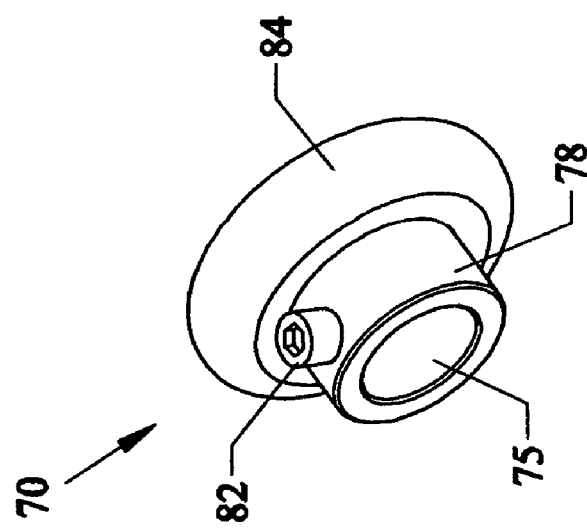

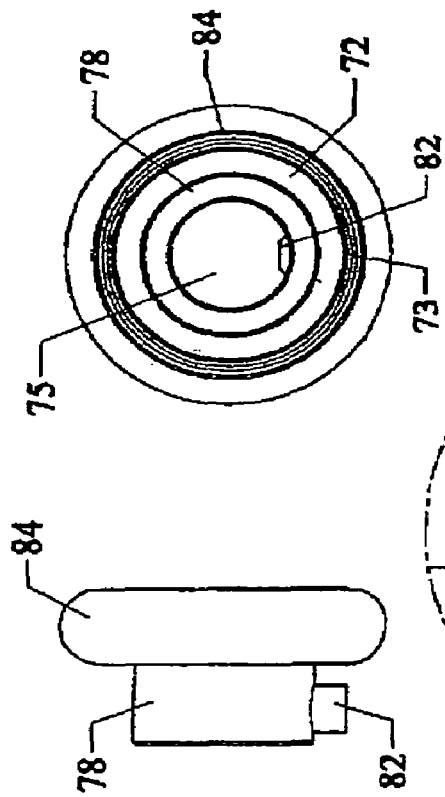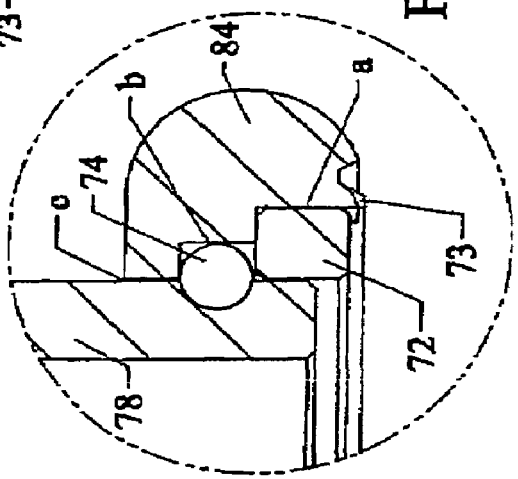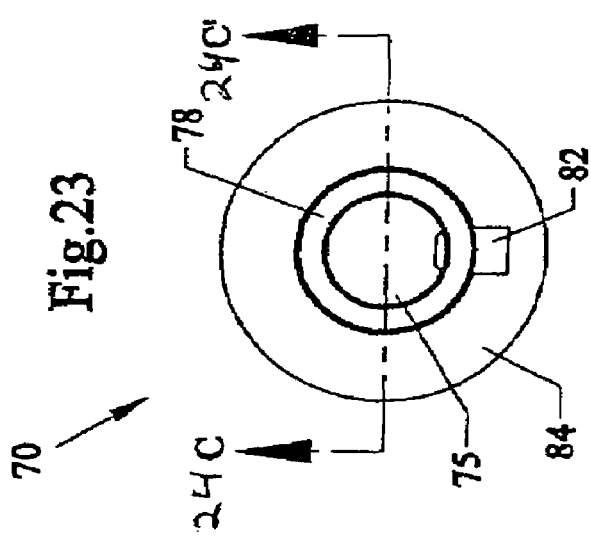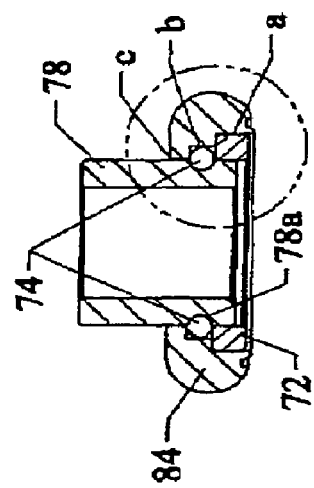

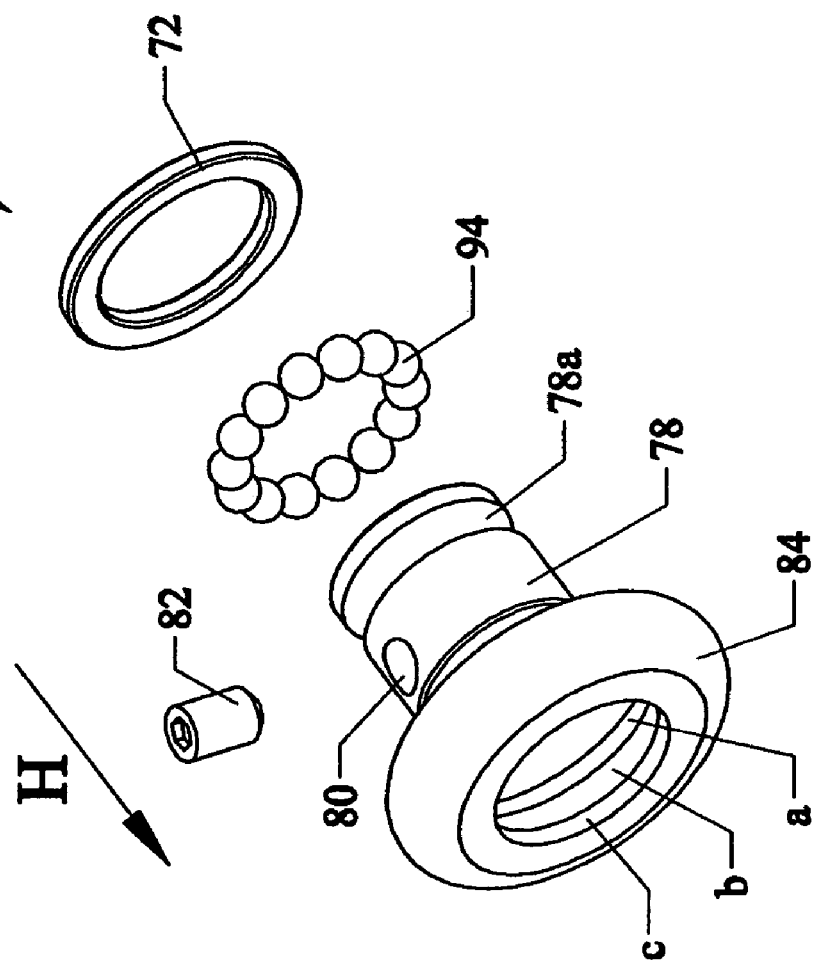
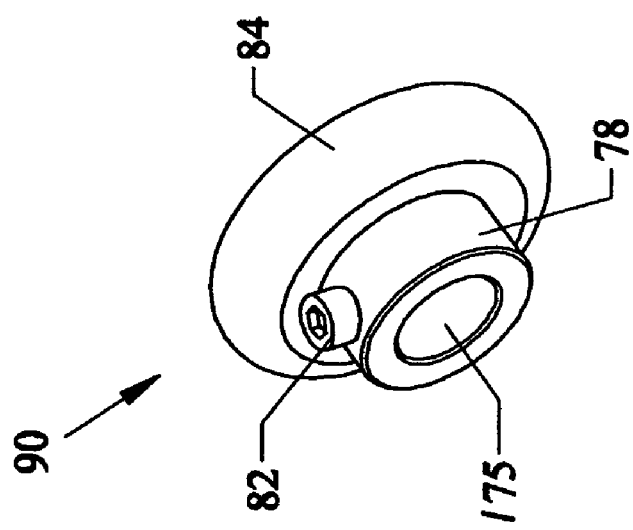

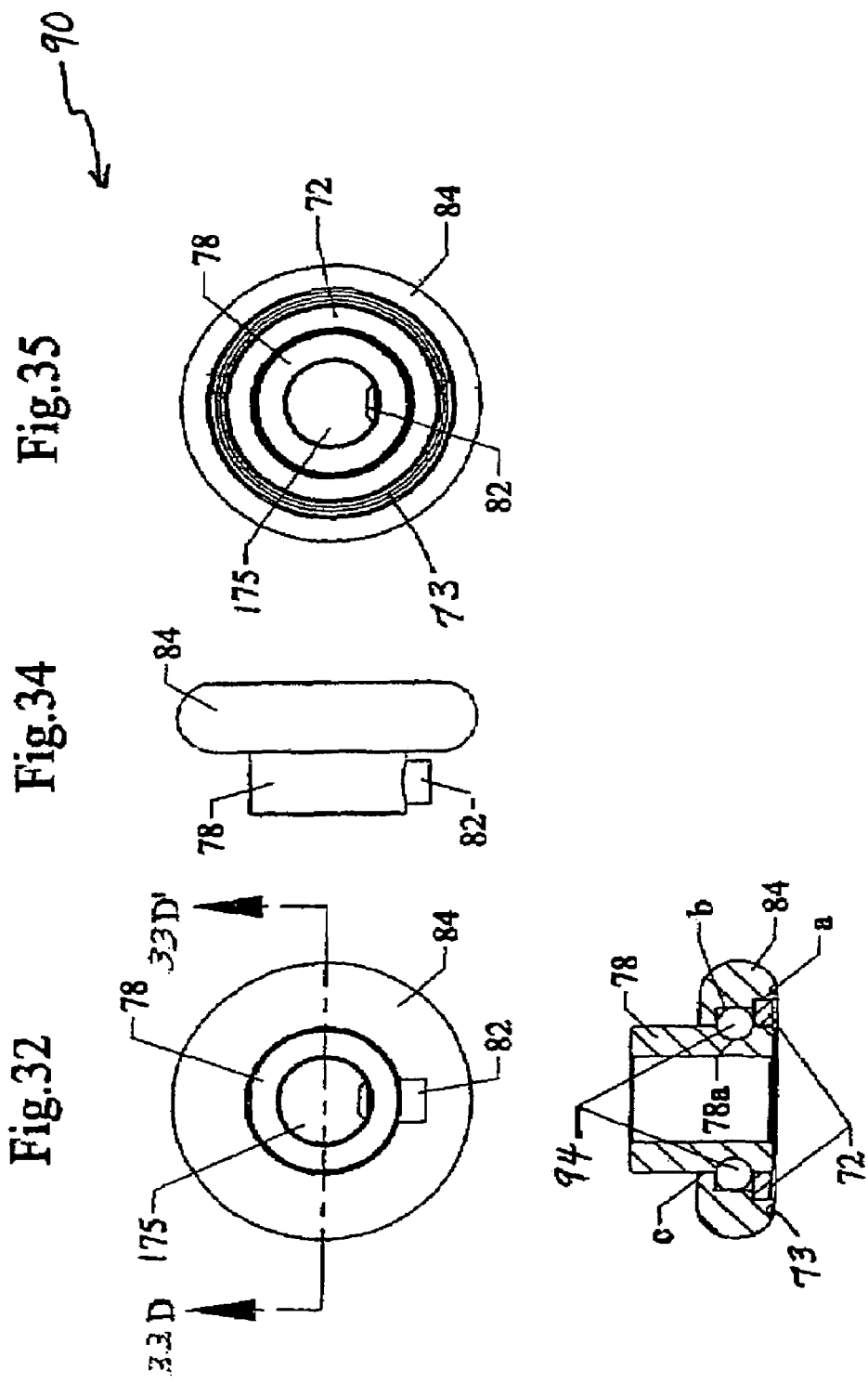

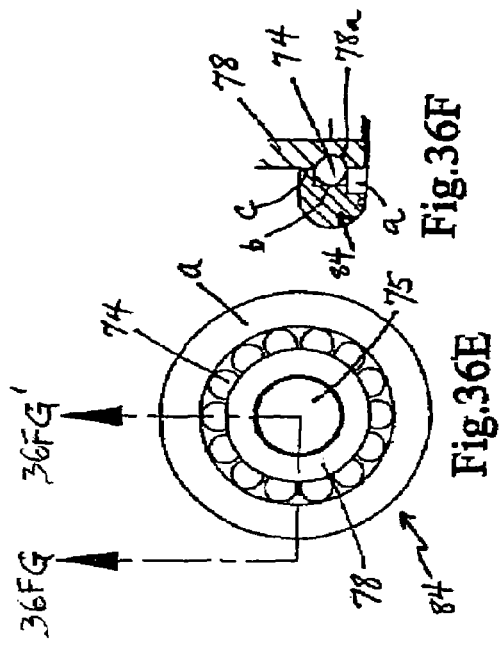
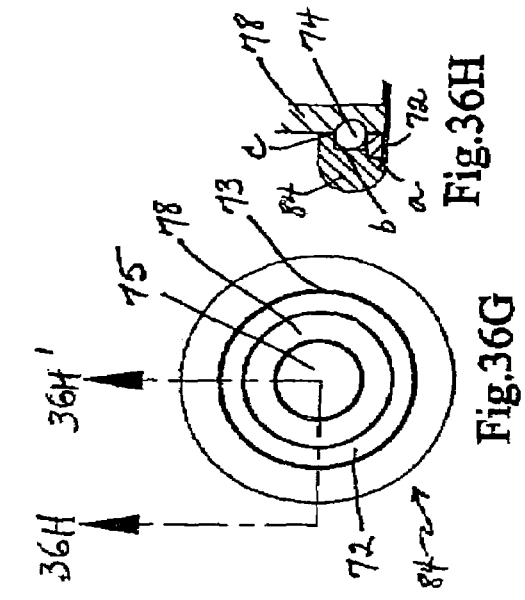
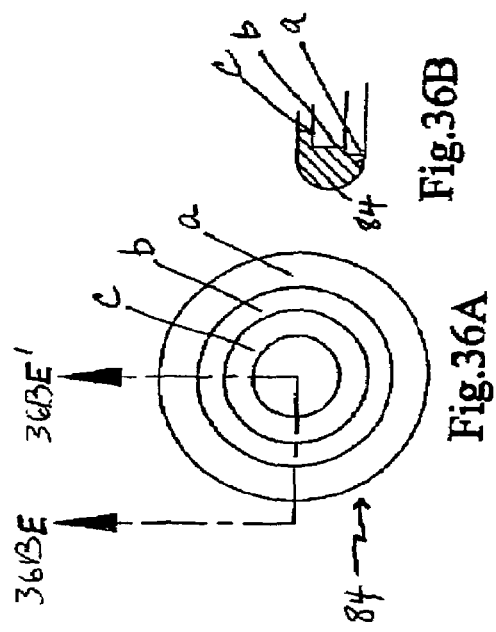
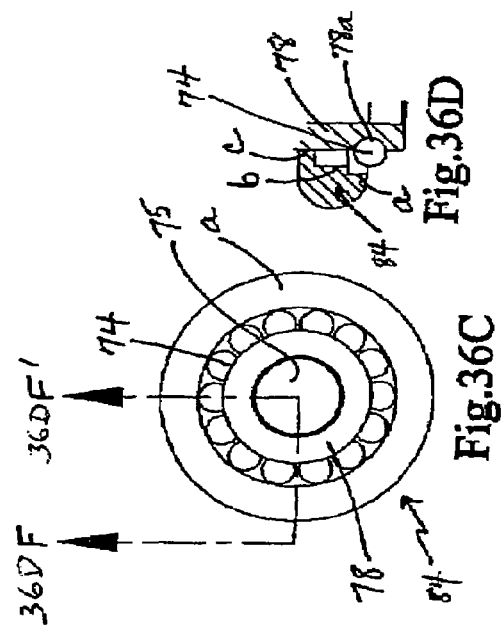

BEARING ASSEMBLY FOR SECURITY AND STORM SHUTTER

The present invention relates to window, screen, hurricane and storm shutters, and in particular, to a roll-up shutter bearing assembly intended for security or storm shutter use and capable of withstanding storm conditions and extremely corrosive environments.

BACKGROUND AND PRIOR ART

Some of the basic approaches to storm protection involve covering and protecting openings and windows in structures to prevent damage from high winds, rain and flying debris. The wind borne debris acts as a missile when it hits windows, doors and other openings, piercing the structure and compromising the building's structural integrity. In extreme winds of a hurricane, cyclone or tornado, a breached opening in a structure can allow damaging wind and rain to enter the building and put extreme design strains on the roof. The roof can detach from the house or have severe damage that would not have otherwise occurred if openings were protected effectively.

As a result of the danger and destruction caused by storms in certain parts of the United States, a number of State and local governments have enacted rules and regulations to prevent or minimize damage. The State of Florida, for example, has enacted regulations and building codes due to the frequent occurrence of hurricanes in a number of counties in Florida, such as Brevard, Dade and Broward counties.

One approach to providing protection, which is considered the most cost-effective is the use of plywood, which is firmly attached to the building by nails or screws. Plywood sheets are heavy, weighing approximately 50 pounds each. The plywood must be cut to fit the window or door. The plywood is normally drilled and screwed into the building thus defacing the structure, requiring craftsmanship, labor and hardware. So, what seems to be cost-effective becomes expensive, time-consuming and potentially dangerous if all openings are covered, such that occupants are trapped inside in an emergency. It also makes the interior of a structure very dark, if a power outage occurs. The use of plywood also requires attachment from the outside, again a dangerous activity if a storm is approaching and ladders are required to reach higher floors of a structure.

Another approach is the use of lamination systems or films having a thickness of approximately 10 to 20 mils that are applied to the interior of glass panes to prevent shattered glass from collapsing into the structure. However, since the film is on the inside of the glass, it cannot absorb enough energy from the glass fast enough to prevent a failure or fracture of the glass if the glass pane is struck by debris or projectiles. So, the use of laminated films or tape will reduce rain damage and the risk of individuals being cut by flying glass; but economic loss and damage are not avoided by this method if glass panes are fractured.

Other methods for protecting the windows or doors of a building include products marketed as hurricane or storm shutters. There are basically four kinds available on the market; the storm panel, accordion shutters, colonial/Bahama shutters, and roll-up shutters. Neither of the existing shutter types is without need for improvement.

Storm panels are fabricated from galvanized, aluminum steel or corrugated steel panels as described in U.S. Pat. No. 6,189,264 to DiVeroli and are applied to the exterior of the building in a manner that is similar to the attachment of plywood. DiVeroli describes a means for opening and closing the rigid panels on a track; the operation can be from inside the structure.

Accordion shutters are generally made from extruded aluminum, which form an accordion shape when opening and closing. The accordion shutters are usually permanently attached to the structure, so the aesthetic appearance may often be at odds with the structural design of the building; for example, completely in discord with historic or gothic architecture. An example of an accordion shutter is in U.S. Pat. No. 5,957,185 to Robinson, et al.

The colonial/Bahama shutters shown in U.S. Pat. No. 6,886,294 to Carey can be made of wood, metal or a synthetic material that is permanently attached to a building and incorporated into an exterior window. This shutter has a style that is suitable for a limited kind of architecture and is known to block or detract from the view through a structural opening. Carey provides a rectangular frame designed and constructed to improve the structural integrity of colonial/Bahama shutters.

The roll-up type of hurricane shutter is disclosed in U.S. Pat. No. 4,723,588 to Rüppel. FIG. 1 is an illustration of a conventional roll-up shutter that has several connected metal panels 30 that can be rolled up into a housing or cover 20 with a service cover 10. The shutter is attached permanently to the exterior of a structure and can be motorized for ease of use and operation from the interior of the building.

FIG. 1A shows a split curtain style roll up shutter 110 for double windows. The split curtain style uses a ball bearing assembly at a center point 115 and another ball bearing assembly (not shown) at the end of the idler shaft on side wall 120.

The roll-up shutter overcomes many objections to other protective means described above with ease of use, permanent installation so there is no rush to install before the storm hits, a not-too-objectionable housing attached to a building's facade, and the ability to operate the opening and closing from inside the structure. The major problem with the roll-up shutter is the requirement for periodic maintenance to ensure operation.

In FIG. 2, the service cover 10 is removed from the housing 20 to reveal the major requirement for maintenance, the ball bearing assembly 40 attached to idler shaft 45. The existing bearing assemblies in roll-up shutters have a serviceable life of a few years, approximately 3 to 5 years. It appears that the bearing assemblies are not intended for storm shutters and certainly not intended for use in corrosive environments near oceans that spawn hurricanes or cyclones. Periodically, the bearings have to be replaced because the plastic elements disintegrate, become brittle, break or crack; the rainwater and sea spray get into the bearing assembly causing the ball bearings to rust and corrode. The failures of ball bearing assemblies lead to inoperable shutters with idler shafts that jam or stick. This leads to service calls, replacement of bearing assemblies, labor and expense. Imagine the nightmare of hurricanes coming and a multi-story condominium building with roll-up storm shutters on hundreds of windows with jammed or broken ball bearing assemblies in some or all of the shutters.

Thus, a need exists for roll-up storm or hurricane shutters that have a ball bearing assembly that does not jam, does not rust, does not corrode, does not stick, does not need to be replaced or serviced on a frequent basis, in time for, or during the hurricane season. It would fill a significant commercial need to have a ball bearing assembly with a serviceable life span of more than 10 years. The present invention provides such an assembly.

SUMMARY OF THE INVENTION

A primary objective of the present invention is to provide a roll-up shutter ball bearing assembly that does not jam or stick.

A secondary objective of the present invention is to provide a roll-up shutter ball bearing assembly that does not rust.

A third objective of the present invention is to provide a roll-up shutter ball bearing assembly that does not corrode.

A fourth objective of the present invention is to provide a roll-up shutter ball bearing assembly that does not require frequent maintenance to ensure operation.

A fifth objective of the present invention is to provide a roll-up shutter ball bearing assembly that is made from non-corrosive materials.

A sixth objective of the present invention is to provide a roll-up shutter ball bearing assembly that fits within the housing of existing roll-up shutters.

A seventh objective of the present invention is to provide a roll-up shutter ball bearing assembly that has a long service life of approximately 10 to 20 years.

An eighth objective of the present invention is to provide a roll-up shutter ball bearing assembly with axial openings in the inner race sized to fit the idler shaft in both single curtain style or split curtain style roll-up shutters.

A ninth objective of the present invention to provide a roll-up shutter ball bearing assembly for opening and closing roll-up shutters weighing from approximately 50 pounds to approximately 300 pounds.

A preferred embodiment of a roll-up shutter ball bearing assembly of the present invention includes a metal, outer bearing ring-shaped housing with an axial opening therethrough, a metal cylindrical insert or inner race having a circumferentially grooved sidewall and an axial opening therethrough, and metal ball bearings positioned in the outer grooved sidewall of the cylindrical insert so that the cylindrical insert when positioned inside of the axial opening of the ring-shaped housing, allows the outer bearing ring housing and the cylindrical insert or inner race to rotate independently of each other.

The preferred ball bearing assembly of the present invention further includes a retaining washer or cap ring to close the assembly.

The preferred outer ring housing, metal cylindrical insert, metal ball bearings, and retaining washer are made of a rust resistant material, such as, but not limited to stainless steel.

The preferred metal cylindrical insert of the present invention has a flat planar top surface and a flat planar bottom surface; the metal cylindrical insert also has a threaded bore hole near the top planar surface to receive a set screw to fasten the idler shaft of the roll-up shutter to the bearing assembly.

A more preferred metal cylindrical insert or inner race has overall dimensions of approximately 0.87 to approximately 0.90 inches in diameter and approximately 0.75 to approximately 0.80 inches in length, includes a threaded side hole and a set screw for fastening an idler shaft of a roll-up shutter and a circumferentially grooved sidewall located near a bottom edge that fits within a ring-shaped cap ring. The preferred ring-shaped cap ring or washer holds the cylindrical insert inside the outer bearing ring.

It is even more preferred that the metal cylindrical insert or inner race not have any portion that can be considered cone-shaped.

The preferred bearing assembly of the present invention includes axial openings in the metal cylindrical inserts sized to fit at least one of a single curtain roll-up shutter and a split curtain roll-up shutter.

A preferred method for preparing a ball bearing assembly that is useful in storm conditions that will not rust, corrode and jam in a corrosive environment includes shaping a metal, outer ring-shaped housing with an axial opening therethrough, cutting three grooves of different diameters and sizes in the interior of the metal, ring-shaped housing, inserting a metal cylindrical insert or inner race having a circumferentially grooved sidewall, adding an assembly of ball bearings, and placing a cap-ring to close the assembly.

The preferred method uses a metal outer ring housing with three interior grooves in a stepped arrangement including one groove having a large diameter, one groove having a medium diameter and one groove having a small diameter. The medium diameter groove and the circumferentially grooved wall of the cylindrical metal insert form a hollow space that is filled with an assembly of ball bearings.

In the preferred method, there is a rib adjacent to a large diameter groove that is folded over to secure the cap-ring.

In the preferred method, the assembly of ball bearings is coated with marine bearing grease before the cap-ring is placed to close the assembly.

The preferred method further includes a metal outer ring housing, a metal cylindrical insert, a retaining washer or cap ring, and ball bearings made of a rust resistant material that includes, but is not limited to, stainless steel.

Further objects and advantages of this invention will be apparent from the following detailed description of the presently preferred embodiments which are illustrated schematically in the accompanying drawings.

BRIEF DESCRIPTION OF THE FIGURES

FIG. 1 is perspective view of a conventional single curtain style roll-up shutter (Prior Art)

FIG. 2 is a conventional single curtain style roll-up shutter, without a service cover, showing the bearing assembly location. (Prior Art)

FIG. 4 is a front perspective view of a conventional metal bearing assembly (Prior Art)

FIG. 5 is an exploded view of a conventional metal bearing assembly (Prior Art)

FIG. 6 is a front view of a conventional metal bearing assembly (Prior Art)

FIG. 7 is a cross-sectional view of a conventional metal bearing assembly along lines 7A, 7A' of FIG. 6 (Prior Art).

FIG. 8 is a side view of a conventional metal bearing assembly (Prior Art)

FIG. 9 is a rear view of a conventional metal bearing assembly (Prior Art)

FIG. 18A is a perspective view of a bearing assembly with a large diameter inner race to accommodate the larger circumference of the idler shaft in the center of a split curtain roll up shutter.

FIG. 18B is a perspective view of a bearing assembly with a small diameter inner race to accommodate the smaller circumference of the idler shaft end inside the housing wall of a roll up shutter.

FIG. 19 is a front perspective view of a bearing assembly of the present invention with a large diameter inner race FIG. 20 is an exploded front view of parts in a bearing assembly of the present invention with a large diameter inner race and parts in order of assembly in the direction of arrow E.

FIG. 23 is a front view of a bearing assembly of the present invention with a large diameter inner race.

FIG. 24 is a cross-sectional view of a bearing assembly of the present invention with a large diameter inner race along the lines 24C, 24C' of FIG. 23.

FIG. 25 is an enlarged view of the swaged in bearing ring shown in FIG. 24.

FIG. 26 is a side view of a bearing assembly of the present invention with a large diameter inner race.

FIG. 27 is a rear view of a bearing assembly of the present invention with a large diameter inner race.

FIG. 30 is a front perspective view of a bearing assembly of the present invention with a small diameter inner race.

FIG. 31 is an exploded front view of parts in a bearing assembly of the present invention with a small diameter inner race and parts in order of assembly in direction of arrow H.

FIG. 32 is a front view of a bearing assembly of the present invention with a small diameter inner race.

FIG. 33 is a cross-sectional view of the bearing assembly of the present invention with a small diameter inner race along lines 33D, 33D' of FIG. 32.

FIG. 34 is a side view of a bearing assembly of the present invention with a small diameter inner race.

FIG. 35 is a rear view of a bearing assembly of the present invention with a small diameter inner race.

FIG. 36A is a perspective view of interior grooves of the outer bearing assembly.

FIG. 36B is a cross-sectional view of the interior grooves of the outer bearing assembly along arrows 36BE, 36BE' of FIG. 36A.

FIG. 36C is a perspective view of ball bearings around the grooved ring on the inner race.

FIG. 36D is a cross-sectional view along arrows 36DF, 36DF' of FIG. 36C showing a ball bearing in the grooved ring of the inner race.

FIG. 36E is a perspective view of ball bearings positioned between the grooved ring on the inner race and one of the interior grooves of the outer bearing assembly.

FIG. 36F is a cross-sectional view along arrows 36FG, 36FG' of FIG. 36E showing a ball bearing in position between the inner race groove and the outer bearing groove.

FIG. 36G is a rear perspective view of the bearing assembly with the retaining washer or cap ring covering the ball bearings.

FIG. 36H is a cross-sectional view along arrows 36H, 36H' of FIG. 36G of the bearing assembly with the cap ring or washer staked over to hold all of the assembled items in place.

DESCRIPTION OF THE PREFERRED EMBODIMENTS

Figure 1A:
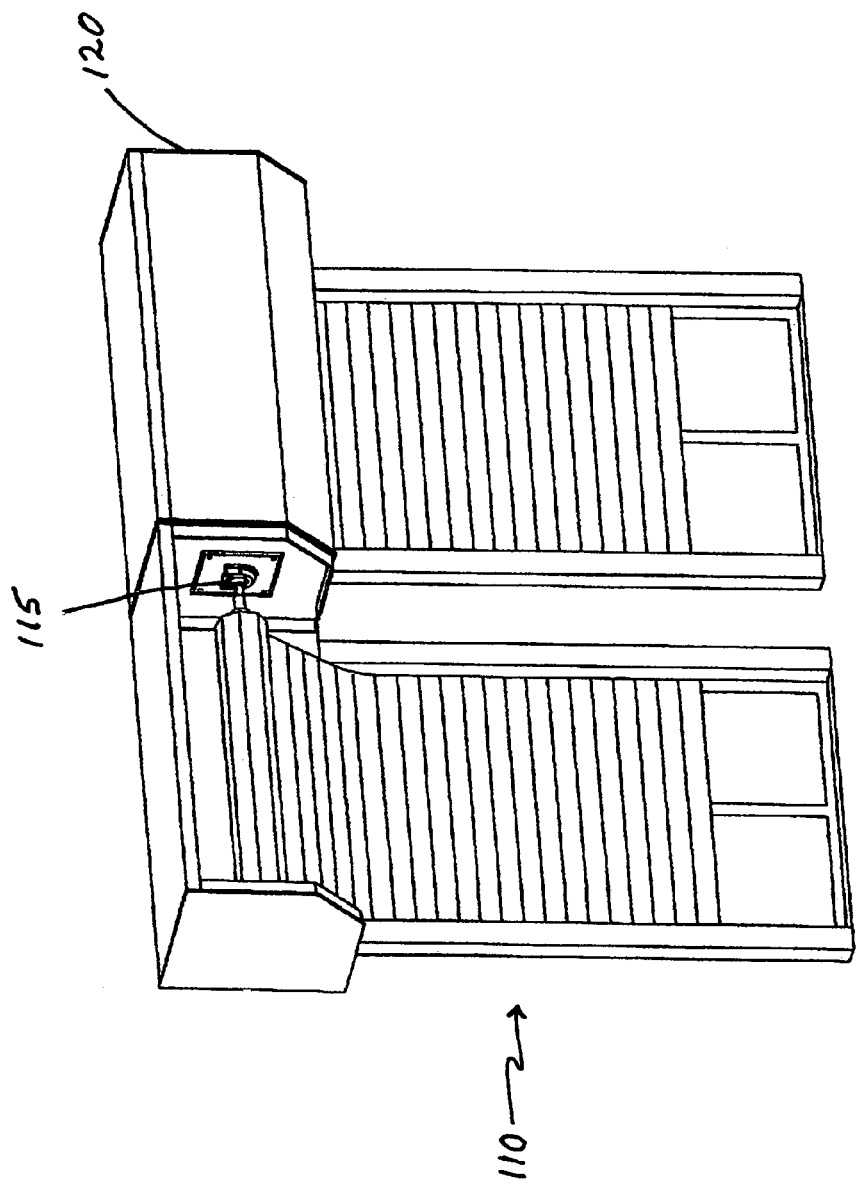
FIG. 1A is a perspective view of a conventional split curtain style roll-up shutter (Prior Art)

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

The terms "metal cylindrical insert" and "inner race" are used interchangeably herein to refer to the rotatable central core of the bearing assembly. The terms "retaining washer" and "cap ring" are also used interchangeably to mean the ring-shaped element that closes the assembled bearing.

The following is a list of the reference numbers used in the drawings and the detailed specification to identify each component.

10 Single curtain roll-up shutter housing service cover
15 Conventional metal ball bearing assembly
20 Housing for single curtain roll-up shutter
25 Conventional cone-shaped plastic insert bearing assembly
30 Roll-up shutter
40 Socket or cradle for ball bearing assembly
60 Bearing assembly of the present invention in socket
65 Bearing assembly of the present invention removed from socket
70 Small ball bearing assembly of the present invention
72 Retaining washer or cap ring
73 Rib on bottom surface of outer bearing ring adjacent to large diameter groove
74 Assembly of small ball bearings
75 Large diameter axial opening in inner race of the ball bearing assembly of the present invention
78 Cylinder to receive idler shaft or inner race
78a Peripheral groove for ball bearings on cylinder that receives the idler shaft
80 Side wall hole in cylinder with threads
82 Set screw
84 Outer bearing ring having internal grooves a, b, c
90 Large ball bearing assembly of the present invention
94 Assembly of large ball bearings
100 Idler shaft in center of split curtain roll up shutter
102 Idler shaft at end of either single curtain or split curtain roll up shutter
110 Split curtain roll up shutter for double hung windows
150 Opening to receive idler shaft in conventional bearing assembly
151 Assembly of ball bearings in conventional bearing assembly
153 Gap between inner metal core and outer bearing ring
155 Conventional metal core that holds idler shaft
155a Upper section of conventional metal core that holds idler shaft that is cone-shaped with flat face
155b A lower section of conventional metal core with a groove that holds ball bearings
160 Outer bearing ring for conventional metal ball bearing assembly 175 Small diameter axial opening in inner race of ball bearing assembly of the present invention.
250 Opening to receive idler shaft in conventional bearing assembly with plastic cone
251 Assembly of ball bearings for conventional bearing assembly with plastic cone
252 Inner cone-shaped plastic insert for conventional bearing assembly
252a Upper section of conventional cone-shaped plastic insert for bearing assembly
252b Lower section of conventional cone-shaped plastic insert with a recessed area for holding ball bearings
254 Outer bearing ring for bearing assembly with cone-shaped plastic insert With reference to the drawings, FIG. 1 shows a conventional, single curtain roll-up shutter for protecting single windows; FIG. 1A shows a split curtain style roll-up shutter for protecting double hung windows. The major structural difference between a conventional single curtain roll-up shutter of FIG. 1 and the split-curtain type 110 in FIG. 1A is that the split-curtain type 110 has an idler shaft with a larger circumference at the center point 115 than at the end of the idler shaft connected to the bearing assembly on the sidewall 120 of the shutter housing. Replacement ball bearing assemblies must be configured to accommodate the variation in circumference of the idler shaft.

FIG. 2 shows a ball bearing assembly 40, connected to idler shaft 45 on the sidewall of a shutter housing 20.

FIGS. 3-16 show the prior art roll-up shutter ball bearing assemblies that rust, corrode, jam, break or crack and lead to a relatively short service time before requiring maintenance, and ultimately replacement.

FIGS. 3-9 provide detail of an existing all-metal bearing assembly used in roll-up shutters on the market and FIGS. 10-16 provide detail of an existing plastic and metal bearing assembly.

Figure 3:
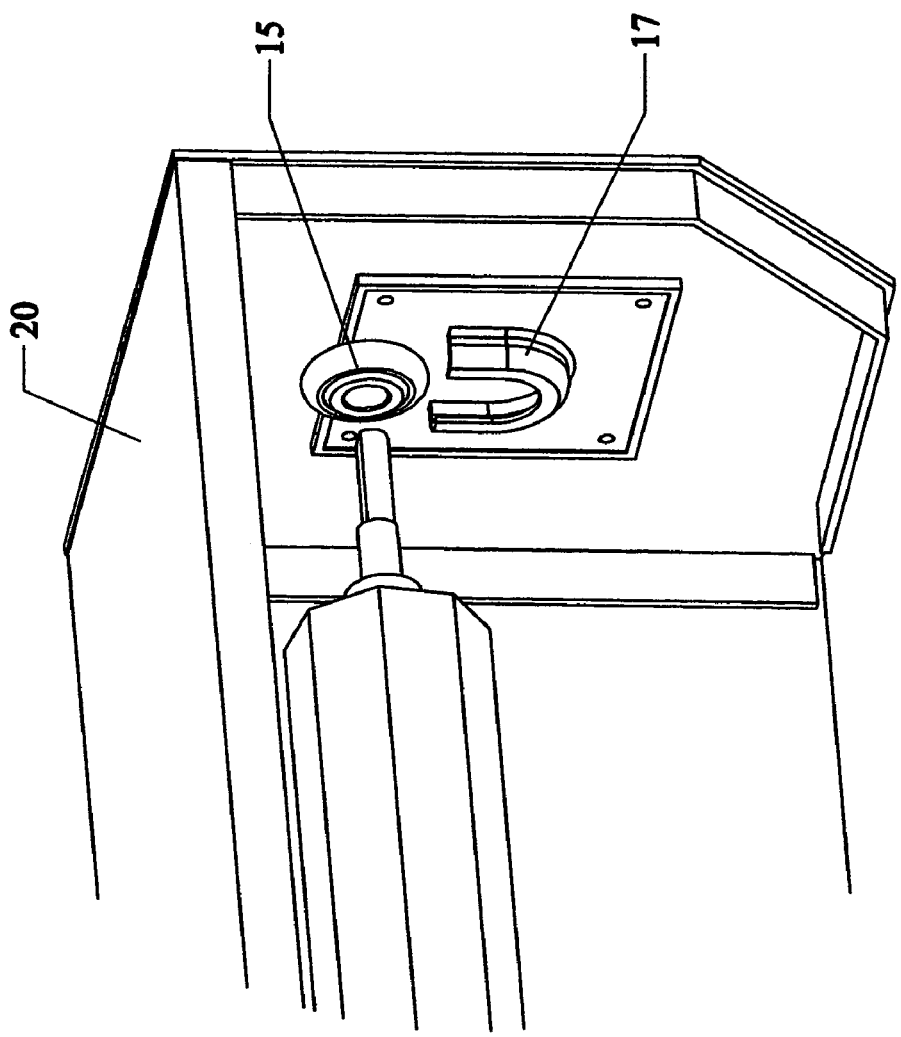
FIG. 3 is a conventional metal bearing assembly removed from the housing cradle (Prior Art)

FIG. 3 shows the cylindrical metal bearing assembly 15 removed from the U-shaped holder or cradle 17 on the inner sidewall of housing 20.

FIG. 4 is a front perspective view of the assembled metal bearing assembly 15 with an axial opening 150 to receive an idler shaft of a shutter. The inner metal core 155 surrounding the axial opening 150 has an upper portion with an abbreviated cone shape ending with a flat planar surface and a lower portion contained within the metal outer bearing ring 160.

FIG. 5 provides an exploded view of each component in the bearing assembly 15. There are three components, the ball bearings 151, the inner metal core 155 and a metal outer bearing ring 160. The ball bearings 151 are shown in an assembled ring similar to the way the loose ball bearings fit in the circumferentially grooved lower portion 155b of the metal core 155 and are contained by the metal outer bearing ring 160 that has one large circumferential groove to receive one side of an assembly of ball bearings 151. The upper portion of the inner core 155a has an abbreviated cone-shape protruding slightly above the upper rim of the metal outer bearing ring 160 terminating in a flat planar surface that faces the shutter roll. The metal core 155 and the cold-formed metal outer bearing ring 160 rotate independently of each other.

FIG. 6 is a front view of the conventional metal bearing assembly 15 showing the axial opening 150, the inner core 155 and the outer bearing ring 160. A cross-sectional view of the bearing assembly 15 along line A, A' of FIG. 6 is shown in FIG. 7 where the inner core 155 has an upper portion 155a with the cone shape and flat planar top surface and a lower portion 155b that is circumferentially grooved to receive one side of an assembly of ball bearings 151. The outer bearing ring 160 is also circumferentially grooved to receive an opposing side of an assembly of ball bearings 151.

FIG. 8 is a side view of the conventional metal bearing assembly showing the slight protrusion of the cone-shaped portion of the inner core 155a above the upper rim of the metal outer bearing ring 160.

FIG. 9 is a rear view of a conventional metal bearing assembly 15 showing the bottom side of the outer bearing ring 160, the bottom side of the inner core 155, and the axial opening 150. FIG. 9 also shows a gap 153 between the outer bearing ring 160 and the inner core 155 which is necessary to permit the independent rotation of the housing and the inner core that receives the idler shaft. It is this gap that allows the intrusion of rain water, corrosive sea air and the like.

Referring now to FIGS. 10 to 16, detail is provided on an existing bearing assembly made with a combination of plastic and metal and used in roll-up shutters in U.S. markets.

Figure 10:
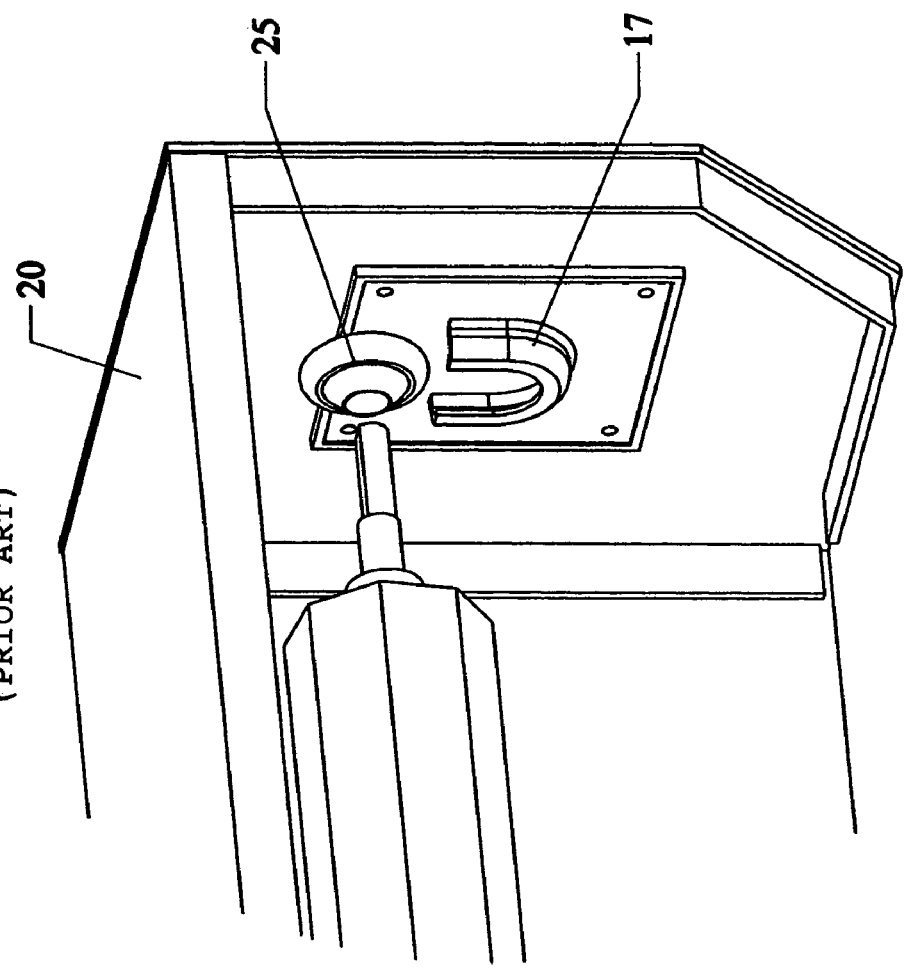
FIG. 10 is a cone-shaped plastic insert bearing assembly removed from the housing cradle (Prior Art)

FIG. 10 shows the bearing assembly with a plastic cone-shaped central core 25 removed from the U-shaped holder or cradle 17 on the inner sidewall of housing 20.

Figure 11:
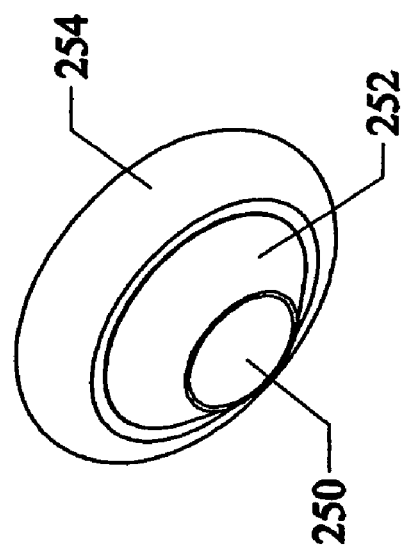
FIG. 11 is a front perspective view of a cone-shaped plastic insert bearing assembly (Prior Art)

FIG. 11 is a front perspective view of the assembled plastic-metal bearing assembly 25 with an axial opening 250 to receive an idler shaft of a shutter. The inner plastic core 252 surrounding the axial opening 250 has an upper portion 252a with a distinctive cone shape ending with a rounded, narrow surface and a lower portion contained within a metal outer bearing ring 254.

Figure 12:
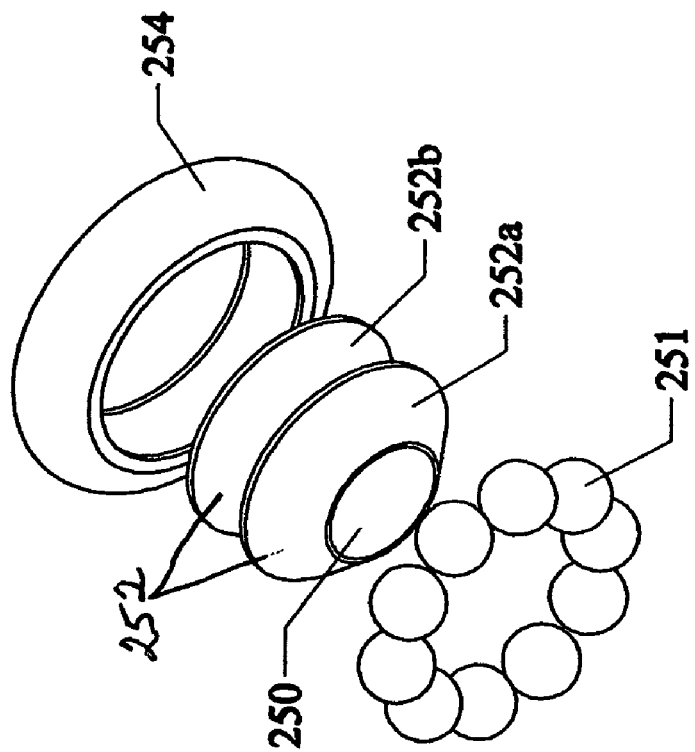
FIG. 12 is an exploded view of a cone-shaped plastic insert bearing assembly (Prior Art)

FIG. 12 provides an exploded view of each component in the bearing assembly 25. There are three components, the ball bearings 251, the inner plastic core 252 and a metal outer bearing ring 254. The ball bearings 251 are shown in an assembled ring similar to the way the loose ball bearings fit in the circumferentially grooved lower portion 252b of the plastic core 252 and are contained by the metal outer bearing ring 254 that is circumferentially grooved to receive one side of an assembly of ball bearings 251. The upper portion of the inner core 252a has a distinctive cone-shape protruding above the upper rim of the metal outer bearing ring 254 terminating in a narrow rounded surface that faces the shutter roll. The plastic core 252 and the swaged metal outer bearing ring 254 rotate independently of each other.

Figure 13:
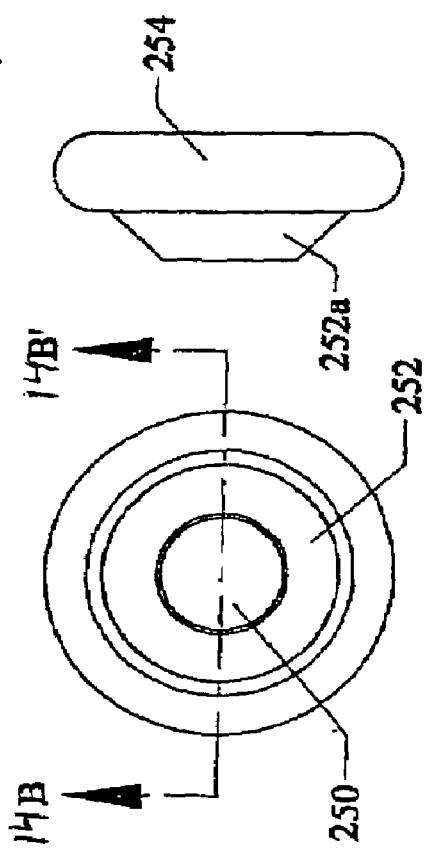
FIG. 13 is a front view of a cone-shaped plastic insert bearing assembly (Prior Art)
Figure 14:
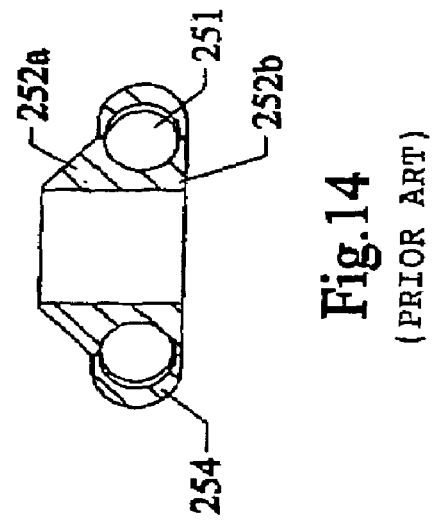
FIG. 14 is a cross-sectional view of a cone-shaped plastic insert bearing assembly along lines 14B-14B' of FIG. 13 (Prior Art).

FIG. 13 is a front view of the conventional plastic-metal bearing assembly 25 showing the axial opening 250, the inner core 252 and the outer bearing ring 254. A cross-sectional view of the bearing assembly 25 along line B, B' is shown in FIG. 14 where the plastic inner core 252 has an upper portion with the cone shape 252a and a narrow, rounded top surface and a lower portion 252b that is circumferentially grooved to receive one side of an assembly of ball bearings 251. The outer bearing ring 254 is also circumferentially grooved to receive an opposing side of an assembly of ball bearings 251.

Figure 15:
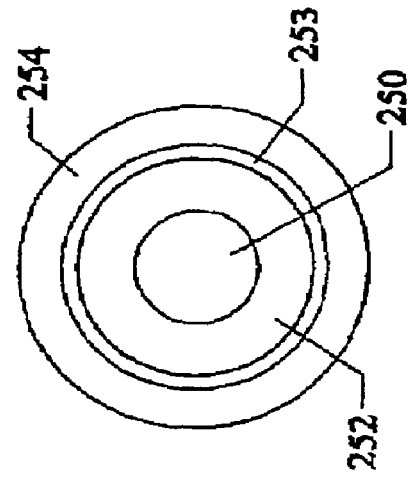
FIG. 15 is a side view of a cone-shaped plastic insert bearing assembly (Prior Art)

FIG. 15 is a side view of the conventional plastic-metal bearing assembly showing the cone-shaped protrusion of the plastic inner core 252a above the upper rim of the metal outer bearing ring 254.

Figure 16:
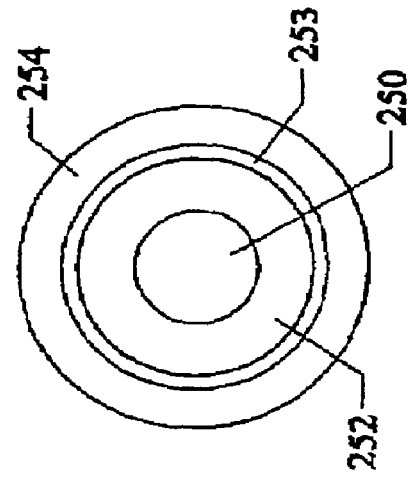
FIG. 16 is a rear view of a cone-shaped plastic insert bearing assembly (Prior Art)

FIG. 16 is a rear view of a conventional plastic-metal bearing assembly 25 showing the bottom side of the outer bearing ring 254, the bottom side of the inner core 252, and the axial opening 250. FIG. 16 also shows a gap 253 between the outer bearing ring 254 and the plastic inner core 252 which is necessary to permit the independent rotation of the housing and the inner core that receives the idler shaft. It is this gap that allows the intrusion of rain water, corrosive sea air and the like.

FIGS. 17-35 provide detail on two embodiments of the present invention that overcome problems of the existing bearing assemblies used for storm shutters, storm conditions and other corrosive and harsh environments.

The first embodiment is designated a bearing assembly with a large diameter axial opening in the inner race that is designed to accommodate the large circumference of the idler shaft in the center of a split curtain roll up shutter. The inner race with a large diameter axial opening has a small circumferential groove for a small size ball bearing. The small ball bearing is approximately 22 mm in diameter.

The second embodiment is designated a bearing assembly with a small diameter axial opening in the inner race designed to accommodate the small circumference of the idler shaft ending at the sidewall of the shutter housing. The inner race with a small diameter axial opening has a large groove for a large size ball bearing. The large ball bearing is approximately 42 mm in diameter.

Thus, the major differences between the bearing assembly with large diameter axial opening in the inner race and the bearing assembly with the small diameter axial opening in the inner race are diameter size of the axial opening, size of the circumferential groove on the inner race and size of the ball bearings.

As an example of the present invention, the bearing assembly with a large diameter axial opening in the inner race is used at the center point of a shaft of a split curtain roll up shutter. As would be understood by a person skilled in the art, the bearing assembly is appropriate for any use involving the attachment to and rotation of a shaft. The major requirement is that the axial opening in the inner race of the bearing assembly be able to accommodate and fasten tightly to the rotating shaft.

A general discussion of the bearing assembly with regard to dimensions and material of construction is provided below.

The design of the bearing assemblies of the present invention is intended to fit into existing roll-up shutter housings. Thus, the overall dimensions of the outer bearing ring, also called the ring-shaped housing, are approximately 1.6 inches to approximately 1.8 inches in diameter with a thickness of approximately 0.4 inches to approximately 0.45 inches.

The cylindrical metal core or inner race that holds the idler shaft is approximately 0.87 inches to approximately 0.90 inches in total diameter and approximately 0.70 inches to approximately 0.75 inches in length. The large diameter axial opening in the inner race is approximately 0.60 inches with a groove recessed approximately 0.126 inches in outer cylindrical wall to hold one side of a small ball bearing (approximately 22 mm in diameter). The small diameter axial opening in the inner race is approximately 0.50 inches with a groove recessed approximately 0.188 to approximately 0.192 inches in the outer cylindrical wall to hold one side of a large ball bearing (approximately 42 mm in diameter). When assembled, the cylindrical metal core or inner race protrudes above the upper rim of the outer bearing ring by approximately 0.375 inches.

The metal outer bearing ring has a unique interior set of three grooves in a stepped arrangement; one of small diameter, one of a medium diameter and one of a large diameter. The small diameter groove fits snugly to the outer cylindrical surface of the inner race. The medium diameter groove holds one side of ball bearings that are positioned in a recessed groove of the inner race. The large diameter groove is fitted with a ring-shaped retaining cap or washer with a thickness of approximately 0.16 inches, an overall diameter of approximately 1.17 inches, and a ring opening of approximately 0.90 inches in diameter. The retaining cap or washer closes the bearing assembly and is staked over by machine to hold all parts of the bearing assembly in place.

A set screw used in the present invention is approximately 0.25 inches in diameter and approximately 0.425 inches in length with an opening for an Allen wrench in the top of the screw. An Allen wrench tightens the set screw and secures the idler shaft to the bearing assembly.

The bearing assembly of the present invention is made of No. 303 stainless steel or any other corrosion or rust resistant materials used in the manufacture of precision tools. Thus, the non-corrosive or rust resistant metal would be used to manufacture the outer bearing ring, the cylindrical metal core, the retaining washer or cap ring, the ball bearings and the set screw. It is also anticipated that Teflon® ball bearings and Teflon® coated metals could be used.

A lubricant can be used during the assembly to extend the life of the ball bearings and all other moving parts of the assembly. The selection of a lubricant can be any of the current lubricants marketed as marine bearing grease. The lubricant will also help provide a more corrosion resistant bearing assembly.

Figure 17:
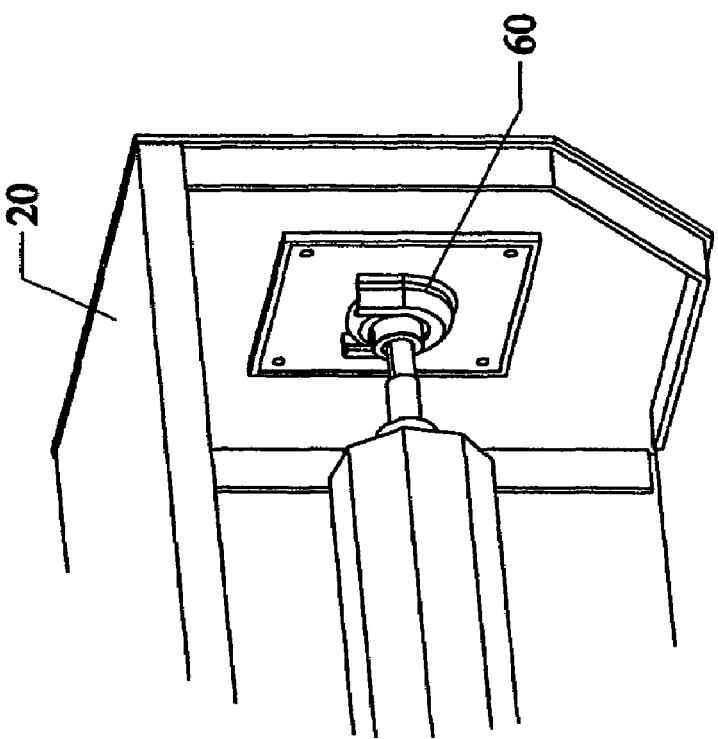
FIG. 17 shows detail of the bearing location of the roll-up shutter. (Prior Art)

FIG. 17 shows the location of the bearing assembly of the present invention in a conventional socket or cradle 60 for bearing assemblies currently on the market. The socket is located on the inner sidewall of the roll-up shutter housing 20.

Figure 18:
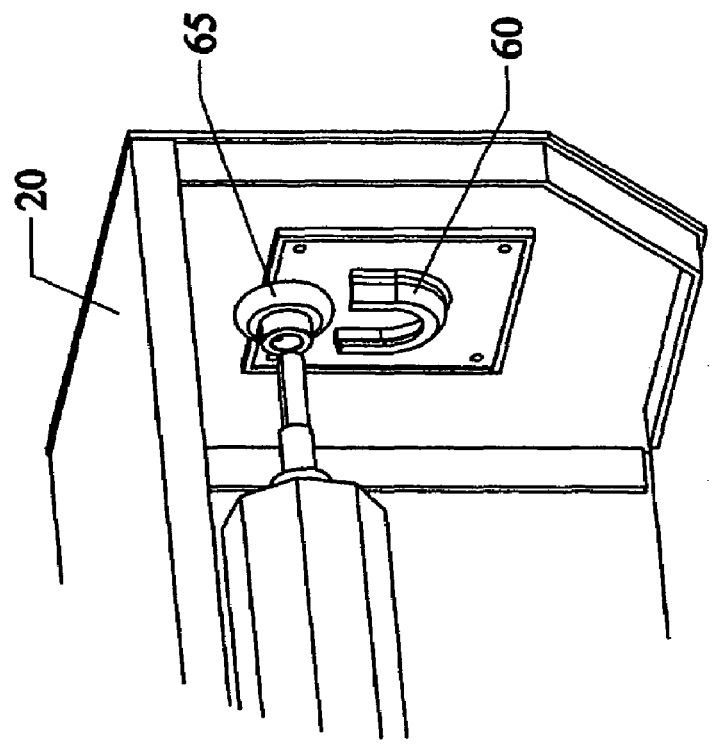
FIG. 18 is the bearing assembly of the present invention removed from the housing cradle.

FIG. 18 shows the ball bearing assembly of the present invention 65 removed from the U-shaped holder or cradle 60 on the inner sidewall of housing 20.

FIG. 18A shows the position of the large diameter inner race 75 at the center of the idler shaft 100 in a split curtain roll-up shutter.

FIG. 18B shows the position of the small diameter inner race 175 at the idler shaft 102 end that fits inside the housing wall of a roll-up shutter.

FIGS. 19-27 provide detail on the bearing assembly with large diameter axial opening in the inner race or metal cylindrical insert.

FIG. 19 is a front perspective view of the bearing assembly with large diameter axial opening in the inner race 70 with an axial opening 75 to receive an idler shaft of a shutter. The cylindrical inner metal core 78 surrounding the axial opening 75 has an upper portion with a cylindrical shape ending with a round flat planar surface and a lower portion contained within the metal outer bearing ring 84. A set screw 82 fits into a bore hole on the upper portion of cylinder 78 to secure the shaft of the idler shaft to the bearing assembly.

FIG. 20 provides an exploded front view of each component in the bearing assembly with large diameter axial opening in the inner race 70 showing how components are assembled in the direction of arrow E. There are five components, the cap ring or retaning washer 72, the ball bearings 74, the cylindrical metal core 78, a set screw 82, and a metal outer bearing ring 84 with a large diameter groove a, a medium diameter groove b, and a small diameter groove c. The ball bearings 74 are shown in an assembled ring similar to the way the loose ball bearings fit in the circumferentially grooved lower portion 78a of the cylindrical metal core 78 and are contained by a groove b in the metal outer bearing ring 84 that is circumferentially grooved to receive one side of an assembly of ball bearings 74. The upper portion of the inner core 78 extends above the upper rim of the metal outer bearing ring 84 and includes a bore hole 80 for a set screw 82 before terminating in a circular, flat planar surface that faces the roll-up shutter. The cylindrical metal core 78 and the metal outer bearing ring 84 rotate independently of each other.

Figure 21:
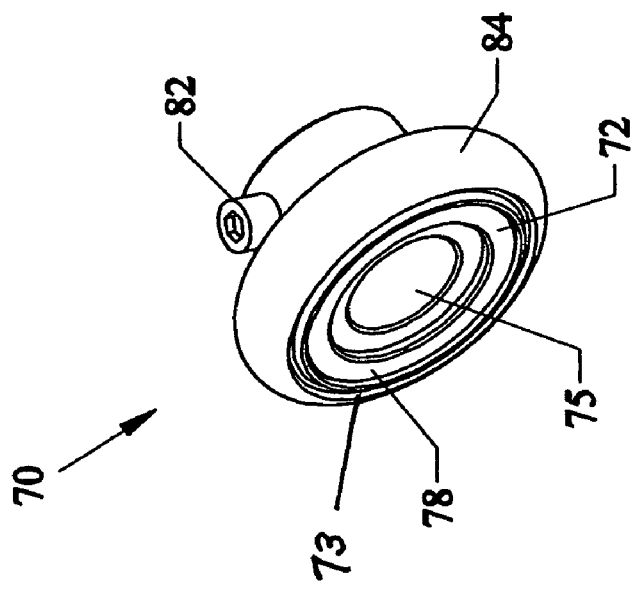
FIG. 21 is a rear perspective view of a bearing assembly of the present invention with a large diameter inner race.

FIG. 21 is a rear perspective view of a bearing assembly with large diameter axial opening in the inner race 70 with an axial opening 75 to receive an idler shaft of a shutter. The inner metal core 78 surrounding the axial opening 75 has an upper portion with a cylindrical shape and a set screw 82 fitting into a bore hole on the upper portion of cylinder 78 to secure the shaft of the idler shaft to the bearing assembly. A lower portion of the cylindrical metal core 78 is contained within the metal outer bearing ring 84 with a rib 73 that is staked or swaged over a cap ring or retaining washer 72.

Figure 22:
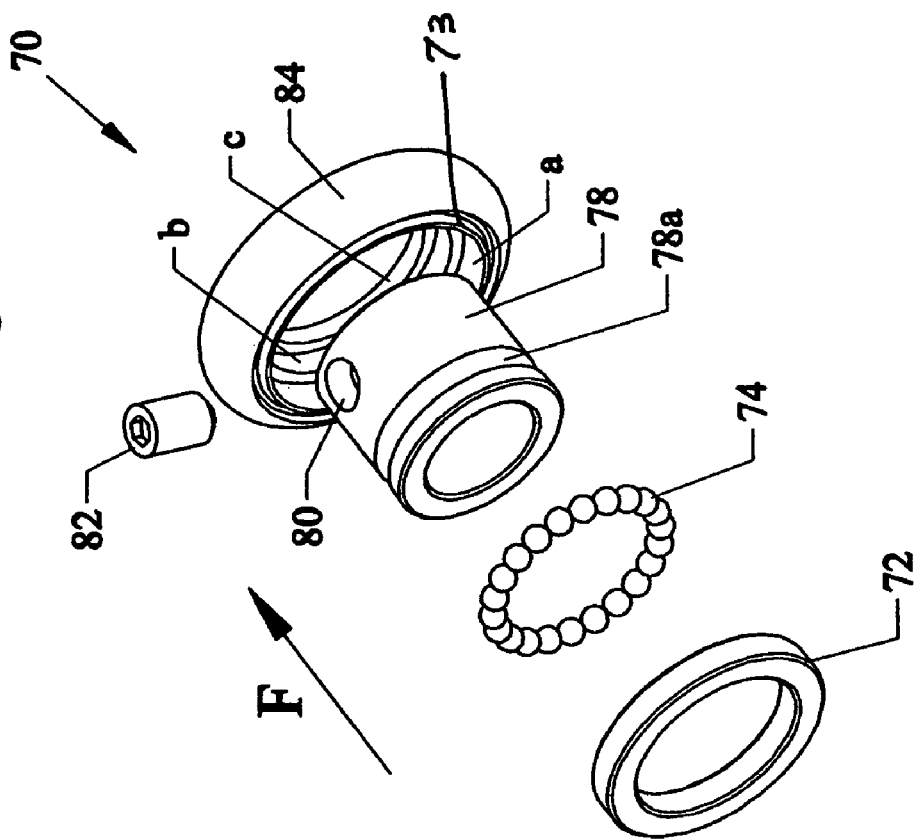
FIG. 22 is an exploded rear view of parts in a bearing assembly of the present invention with a large diameter inner race and parts in order of assembly in the direction of arrow F.

FIG. 22 provides an exploded rear view of each component in the bearing assembly with large diameter axial opening in the inner race 70 showing how the components are assembled in the direction of arrow F. The five components are the cap ring or retaining washer 72, the ball bearings 74, the cylindrical metal core 78, a set screw 82, and a metal outer bearing ring 84 with a rib 73. The ball bearings 74 are shown in an assembled ring similar to the way the loose ball bearings fit in the circumferentially grooved lower portion 78a of the metal cylindrical core 78. The rear view gives a clearer view of the detail of the inner shaping of the outer bearing ring 84. There are three grooves of different sizes and interior diameters. The large diameter groove a is cut near the bottom edge of the outer bearing ring 84 to receive and hold the retaining washer or cap ring 72. The medium diameter groove b is cut in the middle of the ring and is positioned such that it receives one side of the assembly of ball bearings 74 that fit snugly into the peripheral groove 78a for ball bearings on the lower portion of the cylindrical metal core 78. The small diameter groove c is cut near the top of outer bearing ring 84 and forms a snug fit for the cylindrical metal core 78. The upper portion of the cylindrical inner core 78 extends above the upper rim of the metal outer bearing ring 84 and includes a bore hole 80 for a set screw 82 before terminating in a circular, flat planar surface that faces the roll-up shutter. The metal core 78 and the metal outer bearing ring 84 rotate independently of each other.

FIG. 23 is a front view of the bearing assembly with a large diameter axial opening in the inner race 70 showing the axial opening 75, the inner core 78, the set screw 82 in a fully engaged position to hold an idler shaft, and the outer bearing ring 84. A cross-sectional view of the bearing assembly 70 along line C, C' of FIG. 23 is shown in FIG. 24 where the cylindrical metal core 78 has an upper portion that protrudes above the top rim of the outer bearing 84 where a small circumferential groove c fits snugly onto the cylindrical metal core 78. The cylindrical metal core 78 terminates with a flat planar top surface and a lower portion that is circumferentially grooved 78a receives one side of an assembly of ball bearings 74. The outer bearing ring 84 also has a middle diameter circumferential groove b to receive an opposing side of an assembly of ball bearings 74. The flat planar bottom surface of the cylindrical metal core 78 fits snugly into a cap ring 72 that is fits in a large diameter groove a of the outer bearing ring 84.

FIG. 25 is an enlarged cross-sectional view of the outer bearing ring 84 showing greater detail of the internal grooves. Groove a has a large diameter that fits the diameter of the retaining washer or cap ring 72. Groove b has a medium diameter that receives the ball bearings and groove c has a small diameter that fits snugly around the cylindrical metal core 78 protruding above the top rim of the outer bearing ring 84. The grooves, together with the retaining washer or cap ring 72 staked in by rib 73, provide a tight assembly that is not easily penetrated by water and other corrosive elements.

The enlarged cross-sectional view in FIG. 25 shows rib 73 which is a raised metal edge, approximately 1-2 millimeters (mm) in height, along the bottom surface of the outer bearing ring 84 adjacent to the large diameter groove a. Rib 73 is shown in a folded position to further retain and seal the cap ring or retaining washer 72 onto the bearing assembly. The process of folding over or flattening the rib on the bottom of the outer bearing ring 84 is known as swaging or staking.

FIG. 26 is a side view of the light duty metal bearing assembly showing the cylindrical core 78 with inserted set screw 82 protruding from the outer bearing ring 84.

FIG. 27 is a rear view of a light duty metal bearing assembly 70 showing the bottom side of the outer bearing ring 84, the bottom side of the cylindrical inner core 78, the retaining washer or cap ring 72, and the tip of the set screw 82 visible through the axial opening 75. FIG. 27 also shows a swaged rib 73 integrated with the tight fitting elements that contribute to the high quality bearing assembly that limits the intrusion of rain water, corrosive sea air and the like.

Referring now to the bearing assembly with a small diameter axial opening in the inner race 90 shown in FIGS. 28-35, designed to fit a small diameter idler shaft ending at the shutter housing sidewall.

Figure 28:
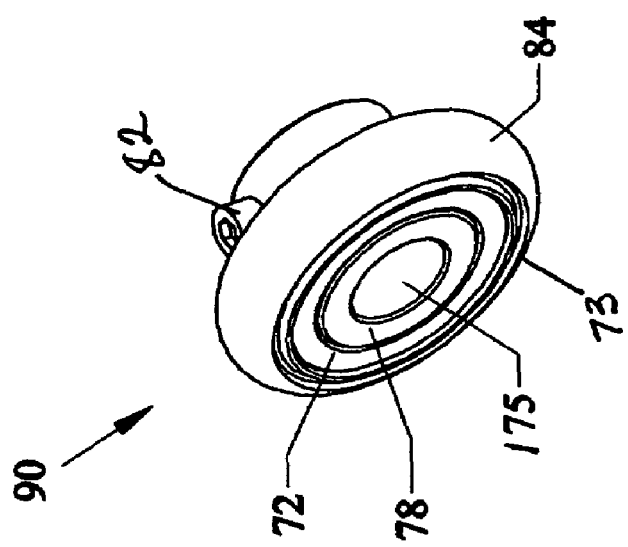
FIG. 28 is a rear perspective of a bearing assembly of the present invention with a small diameter inner race.

FIG. 28 is a rear perspective view of a bearing assembly with a small diameter axial opening in the inner race 90 with an axial opening 175 to receive an idler shaft of a shutter. The cylindrical inner metal core or inner race 78 surrounding the axial opening 175 has an upper portion with a cylindrical shape with a set screw 82 fitting into a bore hole on the upper portion of cylinder 78 to secure shaft of the idler shaft to the bearing assembly. A lower portion of the cylindrical metal core 78 is contained within the metal outer bearing ring 84 and kept in place by a retaining washer or cap ring 72 that fits snugly below the rib 73 that is folded over by machine (swaged) to secure the cap ring 72.

Figure 29:
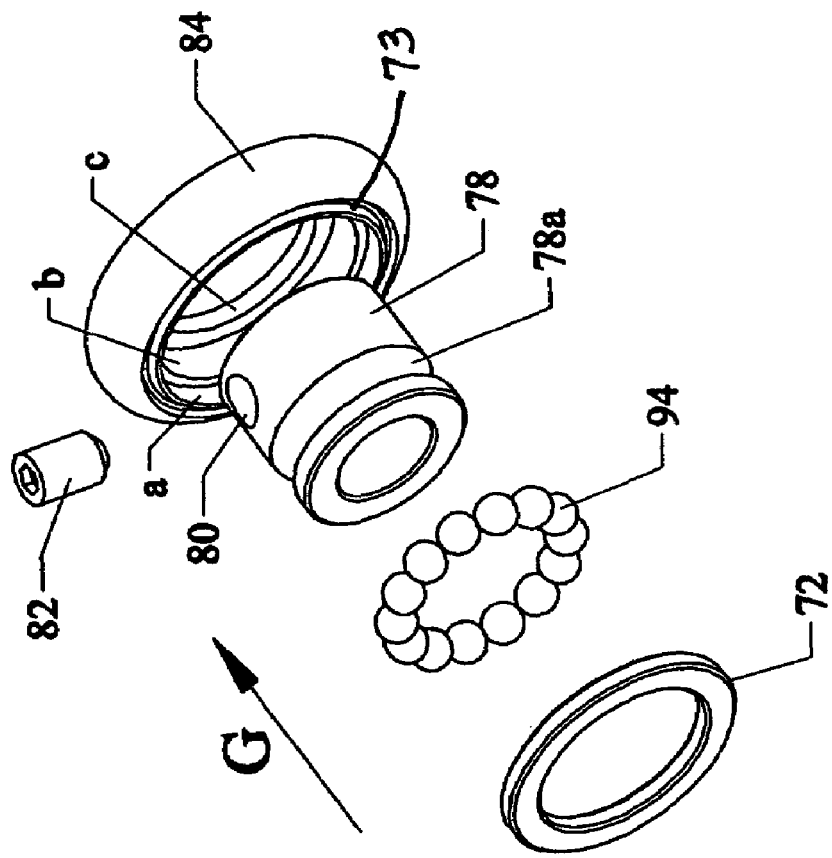
FIG. 29 is an exploded rear view of parts in a bearing assembly of the present invention with a small diameter inner race and parts in order of assembly in direction of arrow G.

FIG. 29 provides an exploded rear view of each component in the bearing assembly with small diameter axial opening in the inner race 90 showing how the components are assembled in the direction of arrow G. The five components are the cap ring or retaining washer 72, the large ball bearings 94, the cylindrical metal core 78, a set screw 82, and a metal outer bearing ring 84 with a rib 73, a large diameter groove a, a medium diameter groove b, and a small diameter groove c. The ball bearings 94 are shown in an assembled ring similar to the way the loose ball bearings fit in the circumferentially grooved lower portion 78a of the metal cylindrical core 78. The rear view gives a clearer view of the detail of the inner shaping of the outer bearing ring 84. There are three grooves of different sizes and interior diameters. The large diameter groove a is cut near the bottom edge of the outer bearing ring 84 to receive and hold the retaining washer or cap ring 72 just below rib 73. The medium diameter groove b is cut in the middle of the ring and is positioned such that it receives one side of the assembly of ball bearings 94 that fit snugly into the peripheral groove 78a for ball bearings on the lower portion of the cylindrical metal core 78. The small diameter groove c is cut near the top of outer bearing ring 84 and forms a snug fit around the cylindrical metal core 78 that protrudes above the top rim of the outer bearing ring 84. The upper portion of the cylindrical metal core 78 extends above the upper rim of the metal outer bearing ring 84 and includes a bore hole 80 for a set screw 82 before terminating in a circular, flat planar surface that faces the roll-up shutter. The metal core 78 and the metal outer bearing ring 84 rotate independently of each other.

FIG. 30 is a front perspective view of the bearing assembly with small diameter axial opening in the inner race 90 with an axial opening 175 to receive an idler shaft of a shutter. The cylindrical inner metal core 78 surrounding the axial opening 175 has an upper portion with a cylindrical shape ending with a round flat planar surface and a lower portion contained within the metal outer bearing ring 84. A set screw 82 fits into a bore hole on the upper portion of cylinder 78 to secure the idler shaft to the bearing assembly.

FIG. 31 provides an exploded front view of each component in the bearing assembly with a small diameter axial opening in the inner race 90 showing how the components are assembled in the direction of arrow H. There are five components, the cap ring or retaining washer 72, the ball bearings 94, the cylindrical metal core 78, a set screw 82, and a metal outer bearing ring 84 with a large diameter groove a, a medium diameter groove b, and a small diameter groove c. The ball bearings 94 are shown in an assembled ring similar to the way the loose ball bearings fit in the circumferentially grooved lower portion 78*a* of the metal core 78 and are contained by a medium diameter groove b in the outer bearing ring 84 that is circumferentially grooved to receive one side of an assembly of large ball bearings 94. When assembled, the upper portion of the inner core 78 extends through small diameter groove c and above the upper rim of the metal outer bearing ring 84 and includes a bore hole for a set screw 82 before terminating in a circular, flat planar surface that faces the roll-up shutter. The metal core 78 and the metal outer bearing ring 84 rotate independently of each other.

FIG. 32 is a front view of the bearing assembly with small diameter axial opening in the inner race 90 showing the axial opening 175, the inner core 78, the set screw 82 in a fully engaged position to hold an idler shaft, and the outer bearing ring 84. A cross-sectional view of the bearing assembly with small diameter axial opening in inner race 90 along line D, D' of FIG. 32 is shown in FIG. 33 where the cylindrical metal core 78 has an upper portion that protrudes above the top rim of the outer bearing ring 84 terminating with a flat planar top surface and a lower portion that is circumferentially grooved 78*a* to receive one side of an assembly of large ball bearings 94. The outer bearing ring 84 also has a medium diameter circumferential groove b to receive an opposing side of an assembly of ball bearings 94. The small circumferential groove c fits snugly around the cylindrical metal core 78 that also has a flat planar bottom side. A large diameter groove a matches the diameter of a cap ring or retaining washer 72 that forms a tight closure for the bearing assembly, further limiting the exposure of the bearing assembly to water and other corrosive materials. An approximately 1 to approximately 2 mm rib 73 on the bottom edge of the outer bearing ring 84 is swaged and staked by machine to keep the retaining washer or cap ring 72 securely in place.

FIG. 34 is a side view of the bearing assembly with small diameter axial opening in the inner race 90 showing the cylindrical core 78 with inserted set screw 82 protruding from the outer bearing ring 84.

FIG. 35 is a rear view of the bearing assembly with small diameter axial opening in the inner race 90 showing the bottom side of the outer bearing ring 84, the bottom side of the cylindrical inner core 78, the swaged and staked rib 73, and the tip of the set screw 82 visible through the axial opening 175. FIG. 35 also shows the tight fitting elements that contribute to the high quality bearing assembly that limits the intrusion of rain water, corrosive sea air and the like. There are no open spaces between the metal elements, yet the interior design of the outer bearing ring 84 allows for smooth, independent rotation of the cylindrical inner core 78 and the outer bearing ring.

Method of Assembly

A brief description of the method for assembling the bearing assemblies of the present invention includes a first step of placing the outer ring shaped housing with three step-wise diameter grooves onto a surface such that the large diameter groove is on the bottom and the outer ring is open to receive the other components. The next step is to place the cylindrical inner metal core or inner race inside the outer ring-shaped housing. Then align the ball bearings around the inner race. Adjust the position of the inner race until the balls drop into the groove on the inner race and the corresponding medium diameter groove of the outer ring-shaped housing. Next, the retaining cap or washer is inserted into the large diameter groove of the outer ring-shaped housing. Then the standing rib on the bottom of the outer ring-shaped housing is swaged or staked over by machine to retain the washer in place.

Referring now to FIGS. 36A-36H, the details of assembly are provided. The explanation is based on the bearing assembly with a large diameter axial opening in the inner race; however, it is to be understood that the method of assembly would apply to all variations in size of the bearing assembly of the present invention.

In FIG. 36A, the outer bearing ring 84 is positioned so that the large diameter groove a is facing an upward position to receive the cylindrical metal core; groove b is facing upward to receive ball bearings and groove c is also facing upward to fit snugly around the cylindrical metal core or inner race when all elements are in place. FIG. 36B is a cross-section of FIG. 36A showing the stepped arrangement of the grooves a, b, c on the interior surface of outer bearing ring 84.

FIG. 36C shows the cylindrical metal core or inner race 78 inserted into the axial opening of the outer bearing ring 84 and surrounded by ball bearings 74. FIG. 36D is a cross-section of FIG. 36C showing the ball bearing 74 in the recessed groove 78*a* near the base of the cylindrical metal core 78. By moving the metal core 78 so that recessed groove 78*a* is in alignment with groove b of the outer bearing ring 84, the ball bearings form a ring-shape around the cylindrical metal core 78 as shown in FIG. 36E. FIG. 36F is a cross section of FIG. 36E showing the ball bearing 74 being held in position in the recessed circumferential groove 78*a* of the cylindrical metal core and medium diameter groove b of outer bearing ring 84. Also shown is the cylindrical metal core 78 fitting snugly into small diameter groove c and protruding above the top edge of the outer bearing ring 84. The large diameter groove a, for the retaining cap or washer, is still vacant.

Referring now to FIG. 36G, marine bearing grease is packed into the grooved area with ball bearings 74 (not shown) prior to placing the cap ring 72 in the large diameter groove a that surrounds the base of the cylindrical metal core 78. A small rib 73, less than approximately 2 mm in height, on the outer edge of large groove a is swaged or staked to hold the cap ring 72 in place and further seal the bearing assembly.

FIG. 36H is a cross-section of FIG. 36G showing the fully assembled bearing with a swaged or staked in retaining cap or washer 72 in large diameter groove a below the ball bearing 74 in groove b and the cylindrical metal core 78 snugly fitting in small diameter groove c of the outer bearing ring 84.

The last part of the assembly is the insertion of the set screw 82 in the bore hole 80 near the top edge of the cylindrical metal core 78 (shown in FIGS. 20 and 21).

The ball bearing assemblies of the present invention are easy to assemble, very sturdy, reliable, resistant to rust and corrosion, and suitable for extended use in storm conditions, and other harsh, corrosive environments.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A roll-up shutter ball bearing assembly consisting essentially of:
   a separate single rust resistant metal, outer bearing ring forming a ring-shaped housing and convex curved outer exterior facing wall surface, with an axial opening therethrough;
   a separate single rust resistant metal elongated cylindrical insert having a first end and an opposite second end, and an axial opening therethrough, with an outer sidewall between the first end and the second end being of uniform diameter so that the cylindrical insert has no cone shape, a single circumferentially grooved in the outer sidewall adjacent to the first end, a single side wall hole adjacent to the second end, the hole passing from outside the cylinder to the axial opening and having interior threads in the hole;
   a ring of rust resistant metal ball bearings positioned in the single circumferentially grooved outer sidewall of the cylindrical insert so that the cylindrical insert when positioned inside of the axial opening of the ring-shaped housing, allows for the outer bearing ring and the cylindrical insert to rotate independently of each other;
   a separate single ring-shaped rust resistant metal retaining cap-ring washer having an opening therethrough, the cap-ring washer having a flat outer sidewall surface, the cap-ring washer for being positioned against the first end of the cylindrical insert for holding the cylindrical insert inside of the outer bearing ring; and
   a separate single rust resistant metal set screw having an upper end and a lower end, the set screw for being inserted into the single side wall hole in the cylindrical insert so that the lower end is adapted to abut against and fasten an idler shaft on a roll up shutter to the bearing assembly.

2. The bearing assembly of claim 1, wherein the metal ball bearings are stainless steel.

3. The bearing assembly of claim 1, wherein the metal cylindrical insert has overall dimensions of approximately 0.87 to approximately 0.90 inches in diameter and approximately 0.75 to approximately 0.80 inches in length.

4. The bearing assembly of claim 3, wherein the rust resistant metal outer bearing ring has a diameter of approximately 1.6 inches to approximately 1.8 inches, and a thickness of approximately 0.4 inches to approximately 0.45 inches.

5. The bearing assembly of claim 4, wherein
   the rust resistant metal outer bearing ring has an inner race with an axial opening diameter of approximately 0.60 inches,
   the single circumferentially groove in the outer sidewall being recessed approximately 0.126 inches in the cylindrical insert, and
   each of the rust resistant ball bearings are approximately 22 mm in diameter.

6. The bearing assembly of claim 4, wherein
   the rust resistant metal outer bearing ring has an inner race with an axial opening diameter of approximately 0.50 inches,
   the single circumferentially groove in the outer sidewall being recessed approximately 0.188 inches to approximately 0.192 inches in the cylindrical insert, and
   each of the rust resistant ball bearings are approximately 42 mm in diameter.

7. The bearing assembly of claim 4, wherein the rust resistant metal retaining cap-ring washer has a thickness of approximately 0.16 inches, an overall diameter of approximately 1.17 inches and the opening has a diameter of approximately 0.90 inches.

8. A roll-up shutter ball bearing assembly consisting essentially of:
   a separate single rust resistant metal, outer bearing ring forming a ring-shaped housing and convex curved outer side wall surface, with an axial opening therethrough, the rust resistant metal outer bearing ring has a diameter of approximately 1.6 inches to approximately 1.8 inches, and a thickness of approximately 0.4 inches to approximately 0.45 inches;
   a separate single rust resistant metal elongated cylindrical insert having a first end and an opposite second end, and an axial opening therethrough, with an outer sidewall between the first end and the second end being of uniform diameter so that the cylindrical insert has no cone shape, a single circumferentially groove in the outer sidewall adjacent to the first end, a single side wall hole adjacent to the second end, the hole passing from outside the cylinder to the axial opening and having interior threads in the hole, the insert has overall dimensions of approximately 0.87 to approximately 0.90 inches in diameter and approximately 0.75 to approximately 0.80 inches in length;
   a ring of rust resistant ball bearings positioned in the single circumferentially grooved outer sidewall of the cylindrical insert so that the cylindrical insert when positioned inside of the axial opening of the ring-shaped housing, allows for the outer bearing ring and the cylindrical insert to rotate independently of each other;
   a separate single ring-shaped rust resistant metal retaining cap-rino washer having an opening therethrough, the cap-ring washer having a flat outer sidewall surface, the cap-ring washer for being positioned against the first end of the cylindrical insert for holding the cylindrical insert inside of the outer bearing ring, the rust resistant metal retaining cap-ring washer has a thickness of approximately 0.16 inches, an overall diameter of approximately 1.17 inches and the opening has a diameter of approximately 0.96 inches; and
   a separate single rust resistant metal set screw having an upper end and a lower end, the set screw for being inserted into the single side wall hole in the cylindrical insert so that the lower end is adapted to abut against and fasten an idler shaft on a roll up shutter to the bearing assembly; and
   a lubricant in the bearing assembly for extending lifespan of all components in the bearing assembly.

9. The bearing assembly of claim 8, wherein
   the rust resistant metal outer bearing ring has an inner race with an axial opening diameter of approximately 0.60 inches,
   the single circumferentially groove in the outer sidewall being recessed approximately 0.126 inches in the cylindrical insert, and
   each of the rust resistant ball bearings are approximately 22 mm in diameter.

10. The bearing assembly of claim 8, wherein
    the rust resistant metal outer bearing ring has an inner race with an axial opening diameter of approximately 0.50 inches,
    the single circumferentially groove in the outer sidewall being recessed approximately 0.188 inches to approximately 0.192 inches in the cylindrical insert, and
    each of the rust resistant ball bearings are approximately 42 mm in diameter.

* * * * *